(12) United States Patent
Kucherov et al.

(10) Patent No.: US 11,210,231 B2
(45) Date of Patent: Dec. 28, 2021

(54) CACHE MANAGEMENT USING A BUCKET-PARTITIONED HASH TABLE

(71) Applicant: EMC IP Holding Company LLC, Hopkinton, MA (US)

(72) Inventors: Anton Kucherov, Dudley, MA (US); Ronen Gazit, Tel Aviv (IL); Vladimir Shveidel, Pardes-Hana (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 240 days.

(21) Appl. No.: 16/665,328

(22) Filed: Oct. 28, 2019

(65) Prior Publication Data
US 2021/0124689 A1 Apr. 29, 2021

(51) Int. Cl.
*G06F 12/0893* (2016.01)

(52) U.S. Cl.
CPC .... *G06F 12/0893* (2013.01); *G06F 2212/608* (2013.01)

(58) Field of Classification Search
None
See application file for complete search history.

(56) References Cited

U.S. PATENT DOCUMENTS

| 6,370,619 | B1 * | 4/2002 | Ho | G06F 12/121 |
| | | | | 711/129 |
| 2019/0102346 | A1 * | 4/2019 | Wang | G06F 16/906 |

OTHER PUBLICATIONS

Anton Kucherov, et al., "System and Method for Deduplication Aware Read Cache in a Log Structured Storage Array," U.S. Appl. No. 16/670,644, filed Oct. 31, 2019.

* cited by examiner

*Primary Examiner* — Charles Rones
*Assistant Examiner* — Ryan Dare
(74) *Attorney, Agent, or Firm* — Muirhead and Saturnelli, LLC

(57) ABSTRACT

Techniques for performing cache management includes partitioning entries of a hash table into buckets, wherein each of the buckets includes a portion of the entries of the hash table, configuring a cache, wherein the configuring includes allocating a section of the cache for exclusive use by each bucket, and performing first processing that stores a data block in the cache. The first processing includes determining a hash value for a data block, selecting, in accordance with the hash value, a first bucket of the plurality of buckets, wherein a first section of the cache is used exclusively for storing cached data blocks of the first bucket, storing metadata used in connection with caching the data block in a first entry of the first bucket, and storing the data block in a first cache location of the first section of the cache.

20 Claims, 13 Drawing Sheets

CACHE MANAGEMENT USING A BUCKET-PARTITIONED HASH TABLE

BACKGROUND

Technical Field

This application generally relates to data storage and, more particularly, to caching techniques.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing cache management comprising: partitioning a plurality of entries of a hash table into a plurality of buckets, wherein each of the plurality of buckets includes a portion of the plurality of entries of the hash table; configuring a cache, wherein said configuring includes, for each bucket of the plurality of buckets, allocating a section of the cache for exclusive use by said each bucket; and performing first processing that stores a data block in the cache, wherein the first processing includes: determining a hash value for a data block; selecting, in accordance with the hash value, a first bucket of the plurality of buckets, wherein a first section of the cache is used exclusively for storing cached data blocks of the first bucket; storing metadata used in connection with caching the data block in a first entry of the first bucket; and storing the data block in a first cache location of the first section of the cache. Each bucket of the plurality of buckets may include a same number of the plurality of entries of the hash table. The first section of the cache may include a number of cache locations equal to a number of entries in the first bucket. Configuring may include allocating a plurality of sections of the cache, wherein a different one of the plurality of sections is allocated for exclusive use by a different corresponding one of the plurality of bucket, and wherein each of the plurality of sections of the cache includes a same number of cache locations.

In at least one embodiment, each entry of the plurality of entries may include a first field identifying a cache location of the cache, and wherein the first field may have a size determined in accordance with the same number of cache locations of the cache allocated for exclusive use by one of the plurality of buckets. The first field of the first entry may reference the first cache location. The first bucket may have a first bucket identifier determined using at least some bits of the hash value determined for the data block. The first entry may be associated with an index determined using at least some bits of the hash value determined for the data block.

In at least one embodiment, the hash value may be generated using a hash function and a key that is provided as an input to the hash function, wherein the key may be associated with the data block. The key may have an associated size of N bits. The first bucket may have a first bucket identifier determined using M of the N bits of the key associated with the data block. M may be less than N and the M bits of the key may be encoded in the first bucket identifier. The first entry may include a field having a size that is N-M bits and may include bit values of the N-M bits of the key that are not encoded in the first bucket identifier.

In at least one embodiment, second processing may be performed to read a first data block from the cache. The second processing may include: determining a first hash value for the first data block using a first key associated with the first data block; selecting one bucket of the plurality of buckets using at least some bits of the first hash value, wherein a specified section of the cache is used exclusively for storing cached data blocks of said one bucket; determining a first index for the first data block using at least some bits of the first hash value; using first mapping information for said one bucket to identify a particular entry of said one bucket that is associated with said first index, wherein said first mapping information maps indices of data blocks cached in said specified section of the cache to corresponding entries in said one bucket; determining whether said first key matches an existing key of the particular entry; and responsive to determining the first key matches the existing key of the particular entry, determining that the particular entry is associated with the first data block that is stored in the cache. The particular entry may include a field identifying the cache location of the specified section of cache where the first data block is cached.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
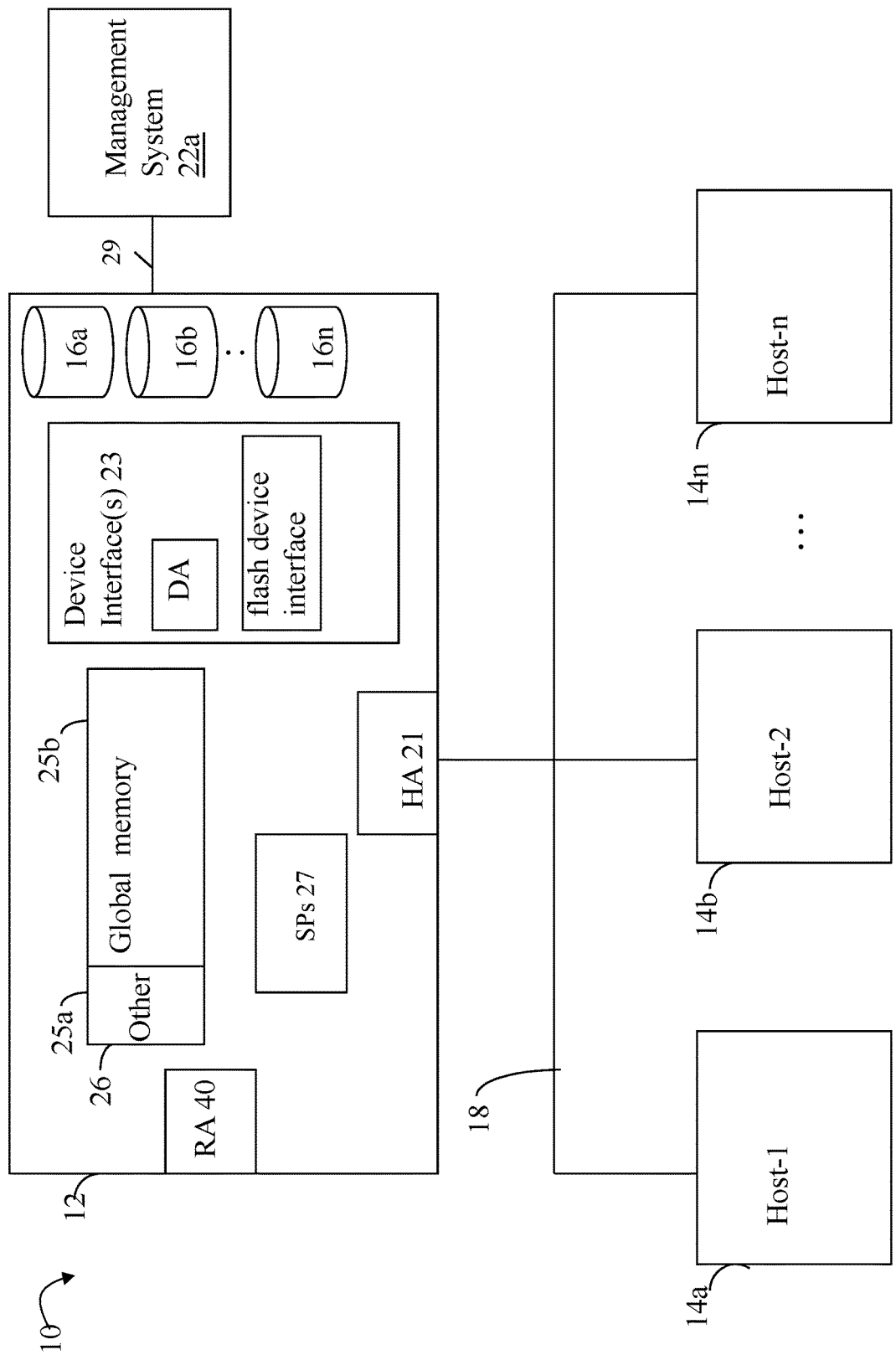
FIG. 1 is an example of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in data cache). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to cache reads as a result of a cache miss whereby the DA writes read miss data (retrieved from physical storage) to cache and the HA then retrieves the requested data from the cache to return to the requesting host.

In connection with write operations and write I/O path processing, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

As data for I/Os and other processing is stored in the cache, a cache memory location, such as a cache slot or cache page, may be allocated for use in storing such data. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique and data structure(s) known in the art may be used in connection with the cache. For example, at least one existing system may employ the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount.

Although not illustrated in FIG. 1 for simplicity and as known by those of ordinary skill in the art, an embodiment may store additional information for cached data, such as the read and write data described above that may be stored in the data cache. For example, for a particular LUN and offset (e.g., LBA) denoting a logical address, such additional information may map the logical address to a cache location containing the data for that logical address. In such a case, for example, the LUN and LBA, LBA alone, or other pointer or reference to the physical storage cache location including the cached data may be used as a key that is mapped to an entry in the cache. The entry in the cache may include other information or metadata (MD) regarding the cached data stored at the particular LUN and LBA. The MD of the entry may include, for example, the cache offset, location or address in a cached storage tier at which the cached data is located. Generally, such additional information such as the MD may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN.

The DA may manage and/or use mapping information mapping a PD and offset on the PD to a cache location including data stored at the offset on the particular PD for use in destaging write data from cache to backend non-volatile PDs 16*a-n*.

When performing various data storage services, data read from and/or written to a LUN may be processed using the typical I/O or data path such as described herein.

In some existing systems, a cache may be implemented using a structure or table of entries where each entry may be mapped to a data block of cached user data. In such systems, the number of entries of the table may increase as the size or amount of the cache storing user data also increases. The table itself may be stored in cache along with the cached used data. Thus, as the size of the table increases with additional entries, more of the cache is used to store the table entries including the MD for the cached user data.

Described in following paragraphs are techniques that may be used to reduce the size or amount of the cache used to store the cache MD such as the entries of the table. In this way, more of the cache may be used to store user data or for other purposes. The techniques provide for partitioning the table of entries including MD for cached data into buckets of entries. A key associated with the user data block may be mapped or translated to a bucket identifier (ID) denoting a first of the buckets. In at least one embodiment, the key may be any suitable value characteristic of, or associated with, the user data block. The key may be provided as an input to a hash function that generates a hash value. The bucket ID may be selected in accordance with the hash value determined for the user data block. Processing may then further select an entry within the first bucket for the user data block. The entry may include MD about the user data block used in connection with caching the user data block. In at least one embodiment, the MD of the entry for the cached user data block may include one or more pointer fields; an offset, location or address in the cache at which the user data block is stored; and other information about the user data block.

In at least one embodiment, each bucket of entries containing MD about cached data may be implemented as a single or double linked list. Each entry of the single linked list for a single bucket may include a forward or next entry pointer to the next entry in the linked list of cache entries for the single bucket. In an embodiment using a double linked list, each entry of the linked list has the forward or next pointer to the next entry as well as a previous or backward pointer to the prior entry in the list. As a result of the techniques herein partitioning the entries into buckets, the size of the forward or next pointer field and the previous or backward pointer field may be reduced in size in comparison to existing systems in which such pointer fields may reference any entry of the table. In at least one embodiment, the linked list denoting a bucket of entries may be used to implement an LRU based cache where the entries of the linked list may have an order denoting the most to least recently used entries. In such an embodiment, an additional mapping structure may be used to map hash values to particular entries on the linked list.

In at least one embodiment, a section of the cache storing user data may also be partitioned into subsections of storage locations. Each storage location may be used for caching a block of user data. In such an embodiment, each bucket of entries may have a corresponding subsection of cache storage locations for storing user data. An entry in bucket J (J being an integer value uniquely identifying one of the buckets of entries) may only reference or point to cache storage locations in a corresponding subsection J in the section of the cache storing user data. In other words, the entry of bucket J may not reference a storage location in any other subsection of cache storage locations other than storage subsection J. As a result of the techniques herein partitioning the section of cache storing user data into buckets and only allowing a bucket J of entries to reference cache storage locations in a single corresponding storage subsection J, the field in each entry that contains the offset, location or address of the storage location in the cache at which the user data block is stored may be reduced in size in comparison to existing systems in which such a field may reference any storage location in the section of the cache.

The foregoing and other aspects of the techniques herein are described in more detail in the following paragraphs.

In at least one embodiment in accordance with the techniques herein, a virtualization layer block (VLB) pointer may be used in connection with a user data block (e.g., stored on backend non-volatile physical storage, such as physical storage on one of the PDs 16*a-n*). The VLB pointer may be a pointer to a VLB structure (also referred to herein as a VLB page or node or simply VLB) that further includes an address or location of the user data block on the nonvolatile backend physical storage allocated for storing the user data or content. In at least one embodiment, the VLB structure may include multiple entries, such as 512 entries. Each entry of the VLB structure may be an address pointing to a different user data block. For example, an entry of the VLB structure may include the address or location on physical storage of a PD where content of a user data block is stored. Thus an entry of a VLB structure may be accessed when accessing the user data block stored on the PD. The address of the entry in the VLB structure may also be referred to herein as a virtual pointer or indirect pointer used to access the user data block. The following paragraphs describe and illustrate the virtual or indirect pointer (e.g., address of an entry in a VLB structure) that may be used as the key for the user data block when caching the user data block in an embodiment in accordance with the techniques herein.

Figure 2:
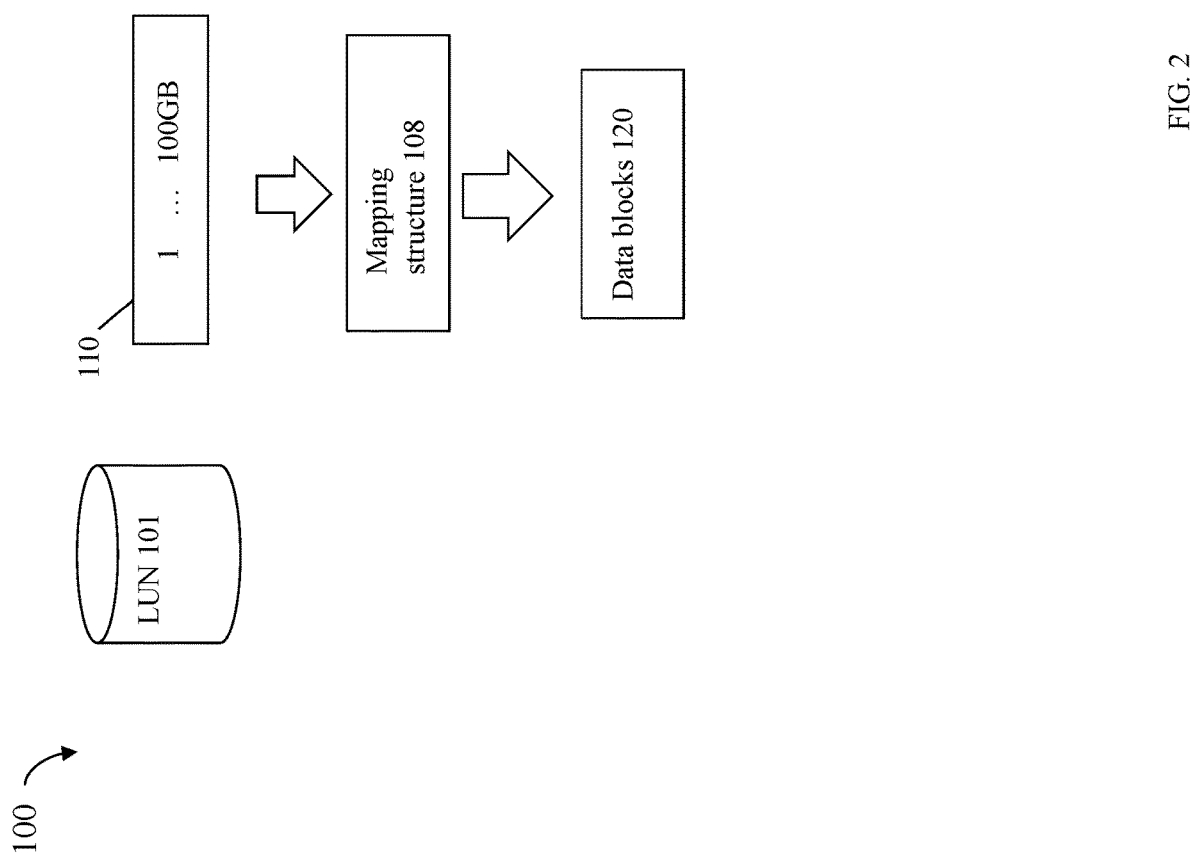
FIG. 2 is an example illustrating use of a mapping structure to map a logical address space to data blocks in an embodiment in accordance with the techniques herein.

Referring to FIG. 2, shown is an example illustrating how logical addresses, such as of a LUN storing user data, may be generally mapped to corresponding physical storage including the user data stored on the LUN in an embodiment in accordance with the techniques herein.

The element 110 may denote the logical address range of the LUN 101. The logical address range for the LUN 101 may have a starting or base address of LBA 1 and an ending or maximum logical address of LBA 1000. The logical addresses or LBAs denoted by 110 may be mapped, using the MD structure 108, to the data block locations storing the contents for the the LUN 101. The data block locations may denote the allocated physical storage data blocks (DBs) 120 storing content for the LUN 101.

In at least one embodiment, the mapping structure 108 may include multiple layers of MD nodes that ultimately map to the data blocks (DBs) (e.g., physical storage locations) including data or contents. In at least one embodiment, the structure 108 may be a multiple layer mapping structure accessed to convert a logical address of the LUN 101 to a physical address of a data block. In at least one embodiment, the structure 108 may include multiple levels or layers of MD nodes or pages arranged in a hierarchy. In at least one embodiment, the bottom or lowest layers in the hierarchy of MD nodes may include MD leaf nodes and VLBs (virtualization layer blocks). Each of the MD leaf nodes may point to or reference (directly or indirectly) one or more blocks of stored data, such as user data stored on the LUN 101. In at least one embodiment, each MD leaf node may be mapped to 512 data blocks using an intervening layer referred to as a virtualization layer of blocks or VLB layer. Each of the VLB blocks of the VLB layer may include 512 entries where each entry points to a data block storing user data. Each of the 512 pointers in a single MD leaf may point to a different entry of a VLB where the entry of the VLB further points to a data block storing user data. The intervening VLBs of the VLB layer may be used, for example, to relocate the underlying data blocks, facilitate data reduction techniques where two MD leaf nodes may point to the same VLB entry identifying the shared data block, and the like. This is illustrated in more detail, for example, in connection with FIG. 6 described elsewhere herein.

Figure 3:
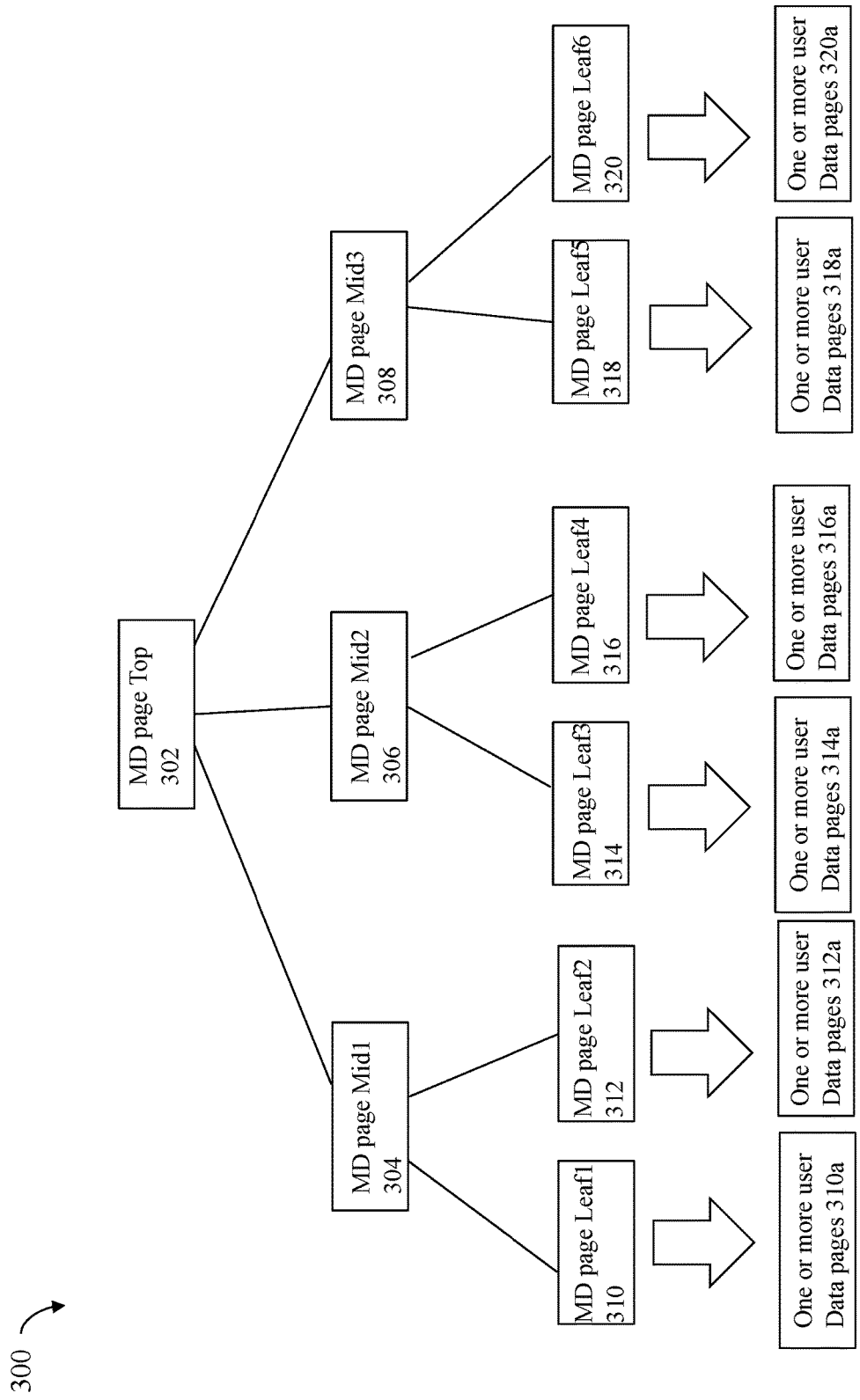
FIGS. 3, 4, 5 and 6 are examples of MD structures that may be included in the mapping structure used to map data blocks to a logical address space in an embodiment in accordance with the techniques herein.

In at least one embodiment, the mapping structure 108 for a LUN, such as a LUN A which may correspond to the LUN 101, may be in the form of a tree having a plurality of levels. More generally, the mapping structure 108 may be in the form of any ordered list or hierarchical structure. In at least one embodiment, the mapping structure 108 for the LUN A may include LUN MD in the form of a tree having 3 levels including a single top or root node, a single mid-level and a bottom level of leaf nodes, where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages of the mapping structure 108 for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages, corresponding to the mapping structure 108 in at least one embodiment, is represented in FIG. 3 as including only 3 levels where each node in the tree may have at most 3 child nodes. Generally, the techniques herein may be used with any layered or hierarchical structure of MD pages.

Referring to FIG. 3, shown is an example of a tree of MD pages that may be used in an embodiment in accordance with the techniques herein. The example 300 includes a tree of MD pages denoting the mapping structure 108 as noted above with 3 levels—a top or root level, level 1, including a single MD page; a single mid or middle level, level 2, of MD pages; and a bottom level, level 3, of leaf nodes of MD pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which may also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages (e.g., pages of data stored on the LUN A 254). For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node may include a reference used to access (directly or indirectly) each of its one or more child nodes. For example, the root node MD page top 302 may include addresses or pointers used to access each of its child nodes 304, 306 and 308. The mid-level node MD page mid1 304 may include addresses or pointers used to access each of its child leaf nodes 310, 312. The mid-level node MD page mid1 306 may include addresses or pointers used to access each of its child leaf nodes 314, 316. The mid-level node MD page mid1 308 may include addresses or pointers used to access each of its child leaf nodes 318, 320.

In at least one embodiment, each of the addresses or pointers included in a MD page that references a location in another MD page or references a location in a UD page may be a physical storage location on the back-end PDs. Thus, the traversal between connected nodes of the structure 300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 may generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

As noted elsewhere herein, the data pages 310*a*, 312*a*, 314*a*, 316*a*, 318*a* and 320*a* include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 3 and as noted elsewhere herein, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, element 310*a* denotes data pages for LBAs 0-511 and 312*a* denotes data pages for the LBAs 512-1023; element 314*a* denotes data pages for LBAs 1024-1535; element 316*a* denotes data pages for LBAs 1536-2047, and so on.

As generally known in the art, a depth-first traversal is an algorithm for traversing or searching tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree. In at least one embodiment, when the structure 300 is traversed in this depth first manner, the MD page leaf nodes that occur in the depth first traversal correspond to consecutive sequential LBA subranges of a LUN. However, the techniques described herein are not limited to any particular correspondence between the LUN LBAs and the different MD page leaves.

In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 600 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 may be known to include MD relevant for accessing data on a particular LUN and one or more LBAs of that LUN. For example, consistent with discussion above, element 310*a* denotes the data blocks for LBAs 0-511 of a LUN. In order to access the data block for an LBA of the LUN in the LBA subrange 0-511, MD pages 302, 304 and 310 may be traversed in sequential order. In particular, the first entry or offset of the MD page top 302 may contain the address of the MD page mid 1 304; the first entry or offset of the MD page mid 1 304 may contain the address of the MD page leaf 1 310; and the first entry or offset of the MD page leaf 1 310 may contain the address of the data blocks for 310*a*.

In a similar manner, a mapping may be made regarding what MD pages of the structure 300 and entries thereof are used in connection with obtaining data blocks containing data for any particular LUN and LBA. In at least one embodiment, the particular MD pages used to access a data block including data for a particular LUN and LBA may be known based on such mappings and correspondence of LBA subranges to particular MD leaf pages.

Figure 4:
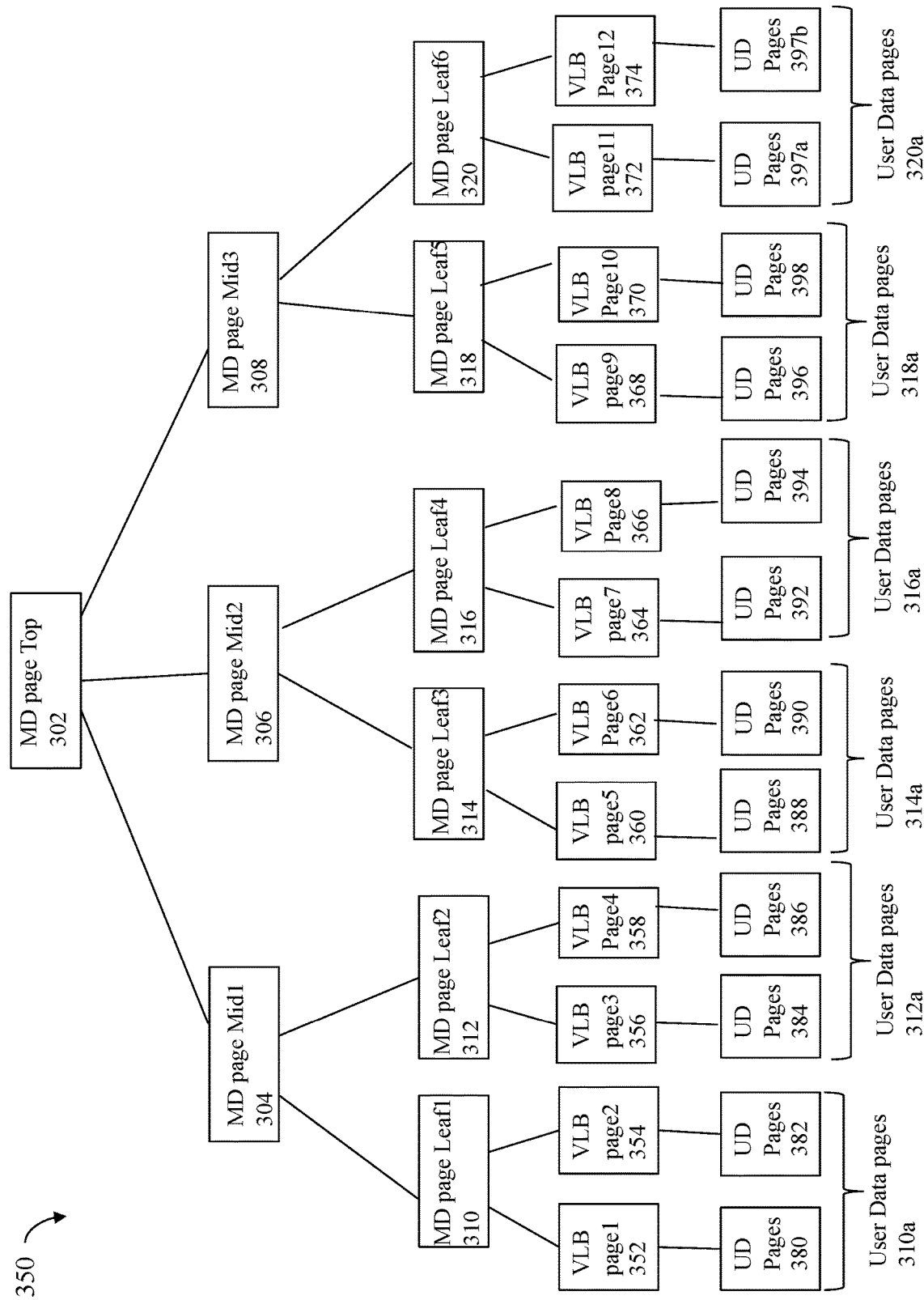

Referring to FIG. 4, shown is a more detailed version of a hierarchical structure used as the mapping structure 108 that may be used in an embodiment in accordance with the techniques herein. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages may be used to facilitate different data storage services, such as relocating UD between different physical storage location, data deduplication, and the like. An entry of the VLB associated with a particular physical storage location may be remapped without requiring remapping of a MD leaf to the UD page.

UD pages 380 and 382 denote two portions of UD pages corresponding to UD pages 310*a* of FIG. 3 including data for LBAs 0-511. UD pages 384 and 386 denote two portions of UD pages corresponding to UD pages 312*a* of FIG. 3 including data for LBAs 512-1023. UD pages 388 and 390 denote two portions of UD pages corresponding to UD pages 314*a* of FIG. 3 including data for LBAs 1024-1535. UD pages 392 and 394 denote two portions of UD pages corresponding to UD pages 316*a* of FIG. 3 including data for LBAs 1536-2047. UD pages 396 and 398 denote two portions of UD pages corresponding to UD pages 318*a* of FIG. 3 including data for LBAs 2048-2559. UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
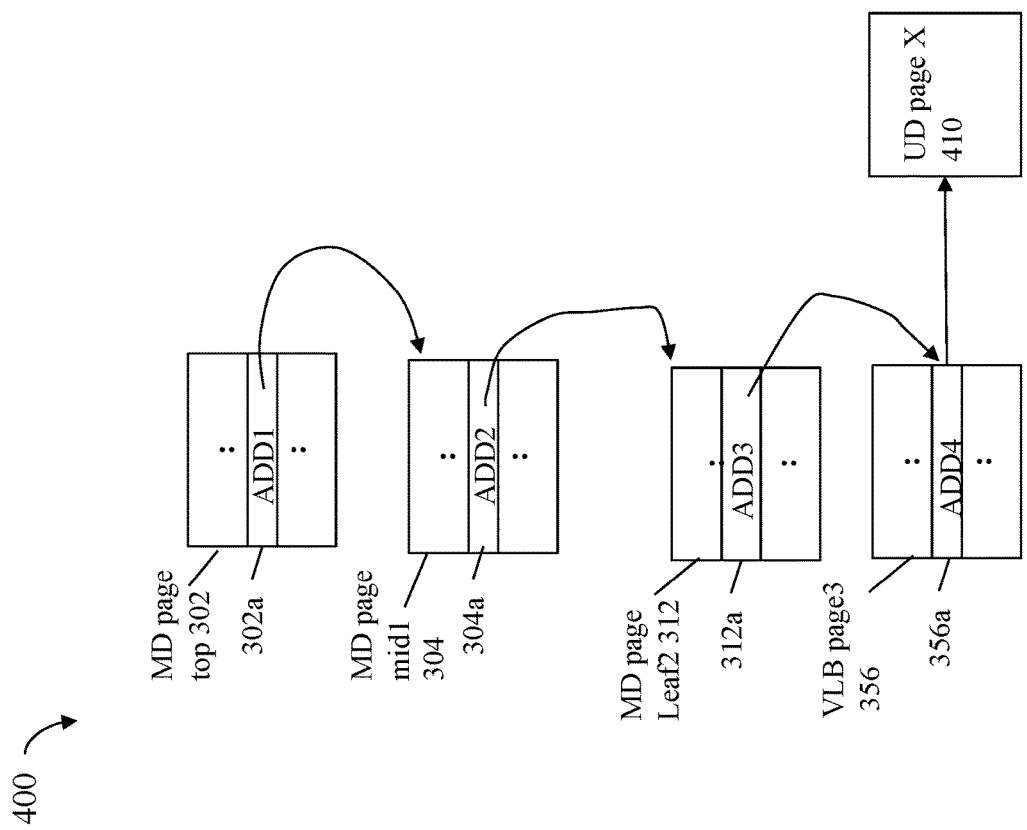

Referring to FIG. 5, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the location 304*a* in the MD page mid1 304. In at least one embodiment, the starting entry 302*a* in the first MD page 302 of the sequence may be determined based on the logical address including the desired UD. For example, assume processing is performed to read the UD for LUN A, LBA 514 located in UD page X. In at least one embodiment, the logical address LUN A, LBA 514 may be used to determine the particular structure instance and thus the particular MD page top 302 to access. The LBA 514 of the logical address of the UD may also be used to determine an index or offset into the MD page 302 to determine the relevant entry, location or address 302*a* having a pointer, address or reference to the next MD page in the sequence to access the desired page including the UD for LUN A, LBA 514. An embodiment generally may use any suitable technique to map a corresponding logical address, such as an LBA of a particular LUN, to an entry in the top level MD page 302.

The MD page top 302 may be accessed and read from a PD to obtain the address or pointer ADD1 from location 302*a*. If the MD page 302 is already in cache, the cached copy may be used to obtain the address or pointer ADD1 from the location 302*a*. The address or pointer ADD1 of location 302*a* may then be used to identify a particular mid level MD page, such as MD page mid1 304, that is accessed next in the sequence.

Continuing with the example 400, the MD page mid1 304 may be accessed where the location 304*a* is read to obtain the address or pointer ADD2 from location 304*a*. The address or pointer ADD2 may then be used to identify a particular leaf level MD page, such as MD page leaf2 312, that is next accessed in the sequence. If the MD page mid1 304 is not in cache, the on-disk copy of the MD page 304 on a PD may be accessed to read the address or pointer ADD2 from the location 304*a*. The address or pointer ADD2 identifies location 312*a* of the MD page leaf 2 312. If the MD page 312 is not already in cache, the on-disk copy of the MD page 312 on a PD may be read to obtain the content of location 312*a*. The location 312*a* of the MD page leaf2 312 may be accessed and read to obtain the address or pointer ADD3 from location 312*a*. The address or pointer ADD3 may then be used to identify a particular entry of a VLB page, such as entry 356*a* of the VLB page3 356, that is next accessed in the sequence. Thus, ADD3 may denote the location or address of the entry 356*a* in the VLB page 3 356.

If the VLB page 356 is not already in cache, the on-disk copy of the VLB page 356 on a PD may be read to obtain the content of location 356*a*. The location 356*a* of the VLB page 3 356 may be accessed and read to obtain the address or pointer ADD4 from the location 356*a*. The address or pointer ADD4 may then be used to identify the particular UD page X 410 where the UD page X may next be read. If the UD page X is not in cache, the on-disk copy of the UD page X may be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
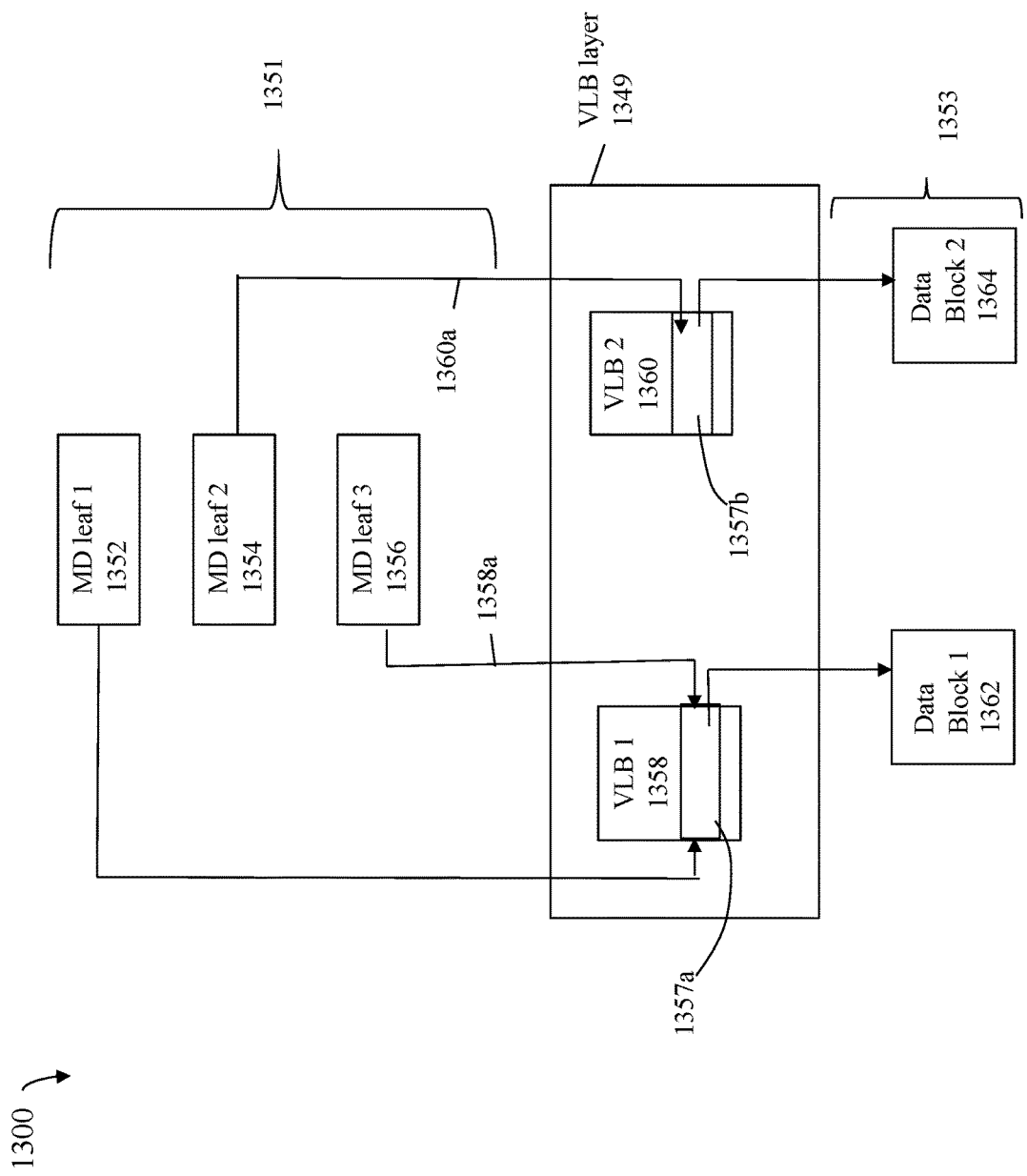

Referring to FIG. 6, shown is an example illustrating in more detail a particular embodiment in which a VLB layer of multiple VLBs is the intervening layer between the MD leaf nodes of the mapping structure 108 and the data blocks. Elements 1352, 1354 and 1356 may denote 3 MD leaf nodes as may be included in the mapping structure 108 illustrated in FIG. 2. Elements 1358 and 1360 denote 2 VLBs included in the VLB layer 1349 between MD leaf nodes 1351 and data blocks 1353. Elements 1362 and 1364 denote 2 data blocks. In the example 1300, MD leaf nodes 1352 and 1356 both indirectly reference the same data block 1362 through the same VLB 1358. The two MD leaf nodes 1352 and 1356 both referencing the same data block 1362 may be a mapping resulting from data deduplication processing. In the example 1300, MD leaf node 1354 points to VLB 1360 whereby the VLB 1360 points to the data block 1364. The data blocks 1362, 1364 may denote user data blocks as described herein.

The element 1358*a* denotes a pointer to, or address of, an entry in the VLB 1358 used in connection with obtaining the data block 1362 stored on a particular LUN and LBA of the LUN. The pointer 1358*a* may be used as the virtual or indirect pointer in connection with obtaining the data block 1362. In at least one embodiment in accordance with the techniques herein, the virtual or indirect pointer 1358*a* (denoting the address of the entry 1357*a*) may be used as a key for the data block 1362. In at least one embodiment described in more detail elsewhere herein, the key may be mapped to a corresponding entry including MD information used in connection with caching the data block 1362. In such an embodiment, the key may first be mapped to a particular bucket J of entries of a hash table. Subsequently, one of the entries in the bucket J may be further mapped to the key for use in storing caching MD for use in caching the data block 1362 in the cache. In at least one embodiment, the VLB 1358 may be included in a VLB page or node as described herein. Thus, in such an embodiment, the virtual or indirect pointer 1358*a* may be a pointer to the entry 1357*a* of the VLB structure, where the entry 1357*a* may further include a pointer to, or address of, the user data block 1362.

The element 1360*a* denotes a pointer to, or address of, an entry in the VLB 1360 used in connection with obtaining the data block 1364 stored on a particular LUN and LBA of the LUN. The pointer 1360*a* may be used as the virtual or indirect pointer in connection with obtaining the data block 1364. In at least one embodiment in accordance with the techniques herein, the virtual or indirect pointer 1360*a* (denoting the address of the entry 1357*b*) may be used as a key for the data block 1364. In at least one embodiment described in more detail elsewhere herein, the key may be mapped to a corresponding entry including MD information used in connection with caching the data block 1364. In such an embodiment, the key may first be mapped to a particular bucket J of entries of a hash table. Subsequently, one of the entries in the bucket J may be further mapped to the key for use in storing caching MD for use in caching the data block 1364 in the cache. In at least one embodiment, the VLB 1360 may be included in a VLB page or node as described herein. Thus, in such an embodiment, the virtual or indirect pointer 1360*a* may be a pointer to the entry 1357*a* of the VLB structure, where the entry 1357*a* may further include a pointer to, or address of, the user data block 1364.

As noted above, in at least one embodiment the virtual or indirect pointer for a data block to be stored in the cache may be used as the key in connection with the techniques herein. The key may be input to a hash function that outputs a hash or hash value. The hash function utilized may be any suitable hash function that generates a hash value for a given input, where the hash values generated are randomly and uniformly distributed and uncorrelated to the particular inputs. In other words, the hash values generated by the hash function H are thus randomly distributed and approximate an even or uniform distribution of hash values. For example, the hash function H above may be a cryptographic hash function that outputs a hash value for a key value, such as the virtual or indirect pointer for a data block. For a key K such as the virtual pointer, H(K) may denote the generated hash value HV such that H(K)=HV.

As a variation, such as in an embodiment which does not have a virtualization or VLB layer, the pointer or address of the data block may be used as the key for the data block. However, following examples use the virtual or indirect pointer of the data block as the key for the data block in connection with illustrating use of the techniques herein in following paragraphs.

In an embodiment in accordance with the techniques herein, the entries of the hash table may be partitioned into buckets of entries. The hash value HV=H(K) output for the key K corresponding to the data block may be used to select one of the buckets. In at least one embodiment, a portion of the bits of the generated HV may be used to select a bucket. An entry from the selected bucket may then be used to store the caching MD used in connection with storing the data block in a cache location. In at least one embodiment, each of the buckets of entries may be a separate linked list of the entries in the bucket. Each individual linked list of entries for a single bucket may be managed independently of the other linked lists corresponding to other buckets of entries. In at least one embodiment, each of the linked list of entries for a bucket may be a singly linked list as described below in connection with FIG. 7A. As a variation, in at least one embodiment, each of the linked list of entries for a bucket may be a doubly linked list as described below in connection with FIG. 7B. In at least one embodiment, the cache may use an LRU cache management policy. With an LRU cache, when a new entry from one of the linked lists is needed, the least recently used entry may be evicted from the cache. Thus, the LRU-based cache tracks relative usage of the entries in the linked lists or buckets of entries such as based on the ordering or position of elements in the lists. A mapping structure may also be used that maps a hash entry containing MD about a cached data block to an index where the index may be based on at least some portion of the generated HV for the data block. For example, the index may be an integer value corresponding to a number of bits of the H(K) where K may be the virtual or indirect pointer for the cached data block associated with the hash entry.

Figure 7A:
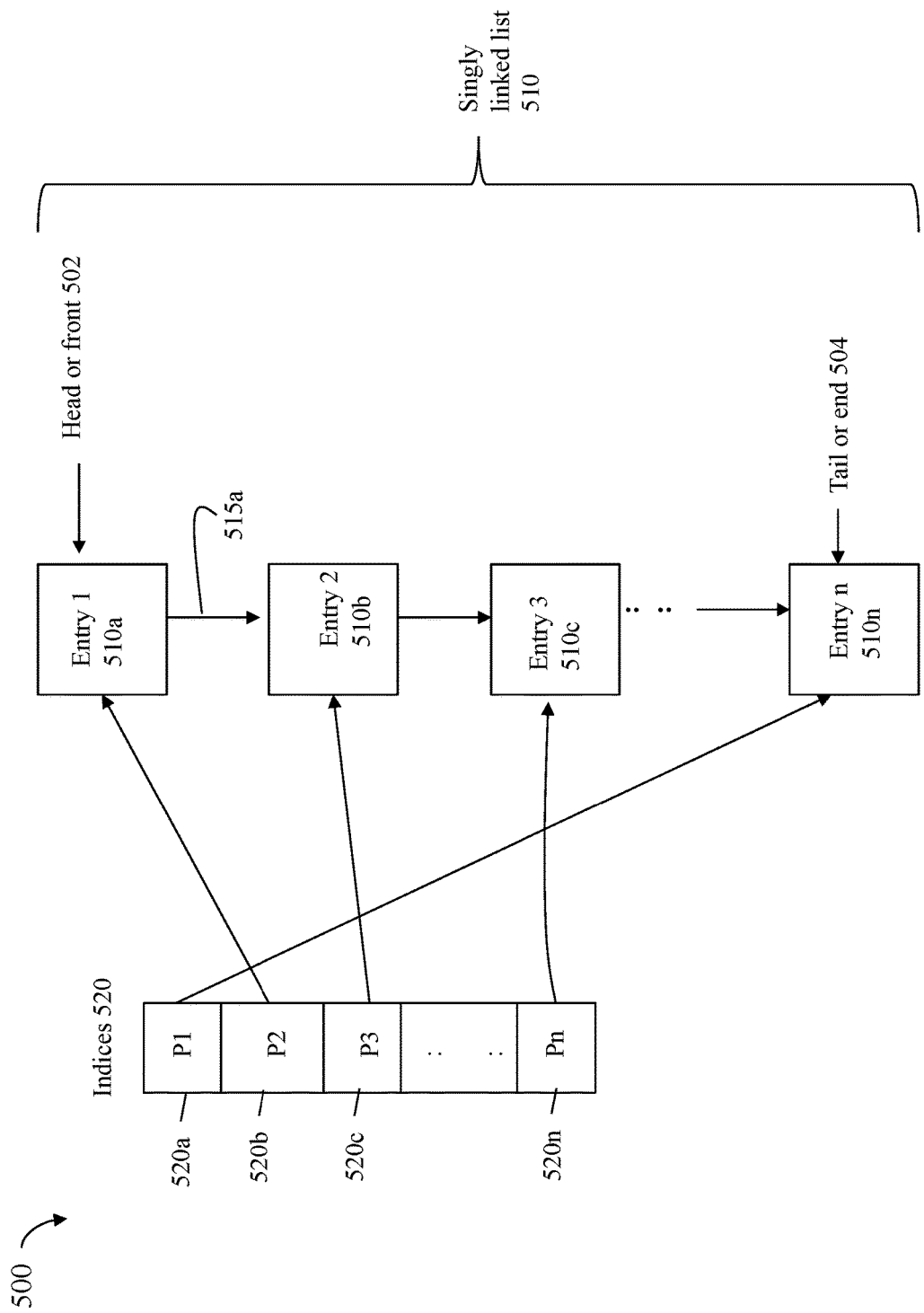
FIGS. 7A and 7B illustrate data structures that may be used in connection with implementing a cache in an embodiment in accordance with the techniques herein.

Referring to FIG. 7A, shown is an example of a singly linked list of hash table entries that may be used in an embodiment in accordance with the techniques herein. The example 500 includes the singly linked list 510 of hash table entries 510*a*-510*n*. The head or front pointer 502 may denote the head or front of the list, and thus the first entry in the list 510. The tail or end pointer 504 may denote the end or tail of the list, and thus the last entry in the list 510.

Each entry of the list 510, except the last current entry 510*n*, points to the next entry in the list. For example, entry 510*a* points to entry 510*b* as denoted by the arrow 515*a*.

In at least one embodiment, the list 510 of entries may be maintained so that the head or front pointer 502 points to the most recently used entry and the tail or end pointer 504 points to the least recently used entry of the list. In at least one embodiment, the total number of entries of the hash table may be partitioned into buckets where each bucket includes the same number of entries, such as "n" entries denoted in FIG. 7A.

Whenever an existing entry of the list 510 is accessed, it may be moved to the head or front 502 of the list so that the most recently used entries are at the head or front of the list. Thus, the entries in the list 510 may appear from most recently used entries to least recently used entries by traversing the list 510 from the head or front 502 to the tail or end 504.

When adding a new entry to the list for a new data block being stored in the cache and there are no free entries, the current entry at the tail or end 504 is evicted in that it is overwritten with information for the new entry being inserted. Once an entry for a particular hash HV has been added to the list 510, where the hash HV is generated for a particular key K, mapping information may be updated. For example, the mapping information may be updated to map a particular index determined for the new data block to the newly added entry including MD about the cached new data block. For example, the index value determined for the new data block just added to the cache may be based on a number of bits from the hash value HV=H(K), where K is the virtual or indirect pointer or other key based on the new data block. The mapping information is denoted by the indices 520 and the arrows or pointers to particular entries in the list 510. For example, index P1 520*a* is mapped to, or references, entry n 510; index P2 520*b* is mapped to, or references, entry 1 510*a*; index P3 520*c* is mapped to, or references, entry 2 510*b*; index Pn is mapped to, or references, entry 3 510*c*, and so on for other indices 520.

Once a new entry is added to the list, or alternatively, an existing entry is updated to contain MD for caching a newly cached data block, the mapping information may be updated to reflect the mapping of the index of the data block to the entry containing the MD for the cached data block. The mapping information may be subsequently used to determine whether the hash table contains an entry corresponding to a particular index of a data block. For example, the mapping information may include the entry 520*a* indicating that index P1 is mapped to entry n 510*n* for a data block. At a later point in time, processing may be performed to obtain the data block from the cache. In connection with such processing, the mapping information of entry 520a may be used to directly access the entry 510n. As described elsewhere herein, the entry 510n may include the cache location or address of where the data block is stored. In this manner, the cache location of the entry 510n may be used to obtain the cached data block, such as for servicing a read I/O operation.

Figure 7B:
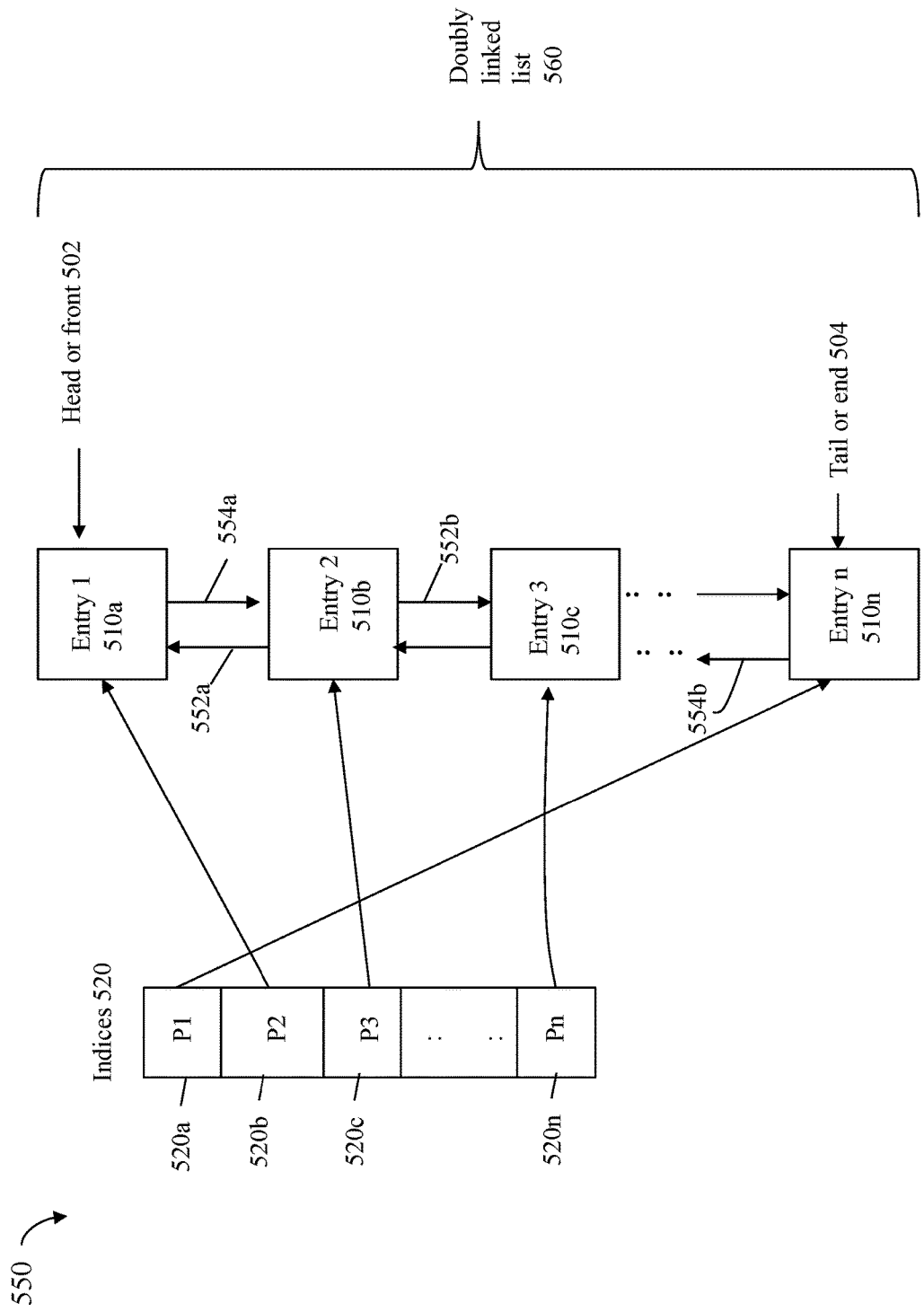

Referring to FIG. 7B, shown is an example of a doubly linked list of hash table entries that may be used in an embodiment in accordance with the techniques herein. The example 550 includes the doubly linked list 560 of hash table entries 510a-510n and indices 520 mapped to particular entries. FIG. 7B includes elements similar to those noted above in connection with FIG. 7A with the difference that that the hash table of entries 560 illustrates a doubly linked list where each entry of the list 560, other than the first entry 510a and last entry 510n, include a forward pointer to the next entry and also include a backward pointer to the previous or prior entry in the list. For example, entry 510b of FIG. 7B includes a pointer 552a to the prior entry 510a and also includes a pointer 552b to the next entry 510c in the list 560. The first entry 510a currently at the head or front 502 of the list only includes a pointer 554a to the next entry 510b in the list 560. The last entry 510n currently at the tail or end 504 of the list only includes a pointer 5554b to the previous or prior entry (not illustrated) in the list.

The following paragraphs describe embodiments in accordance with the techniques herein in which each bucket of hash table entries may be implemented using a singly linked list and associated mapping information as illustrates in the FIG. 7A. However, each bucket of hash table entries may be implemented using a doubly linked list and associated mapping information as illustrated in the FIG. 7B. More generally, the techniques herein may be used in connection with any suitable cache management technique used to implement and manage each of the buckets of hash table entries.

In order to highlight the reduction in cache storage used in an embodiment in accordance with the techniques herein, the discussion below, with reference to FIG. 8, initially describes one way in which the cache may be organized which does not utilize the techniques described herein.

Figure 8:
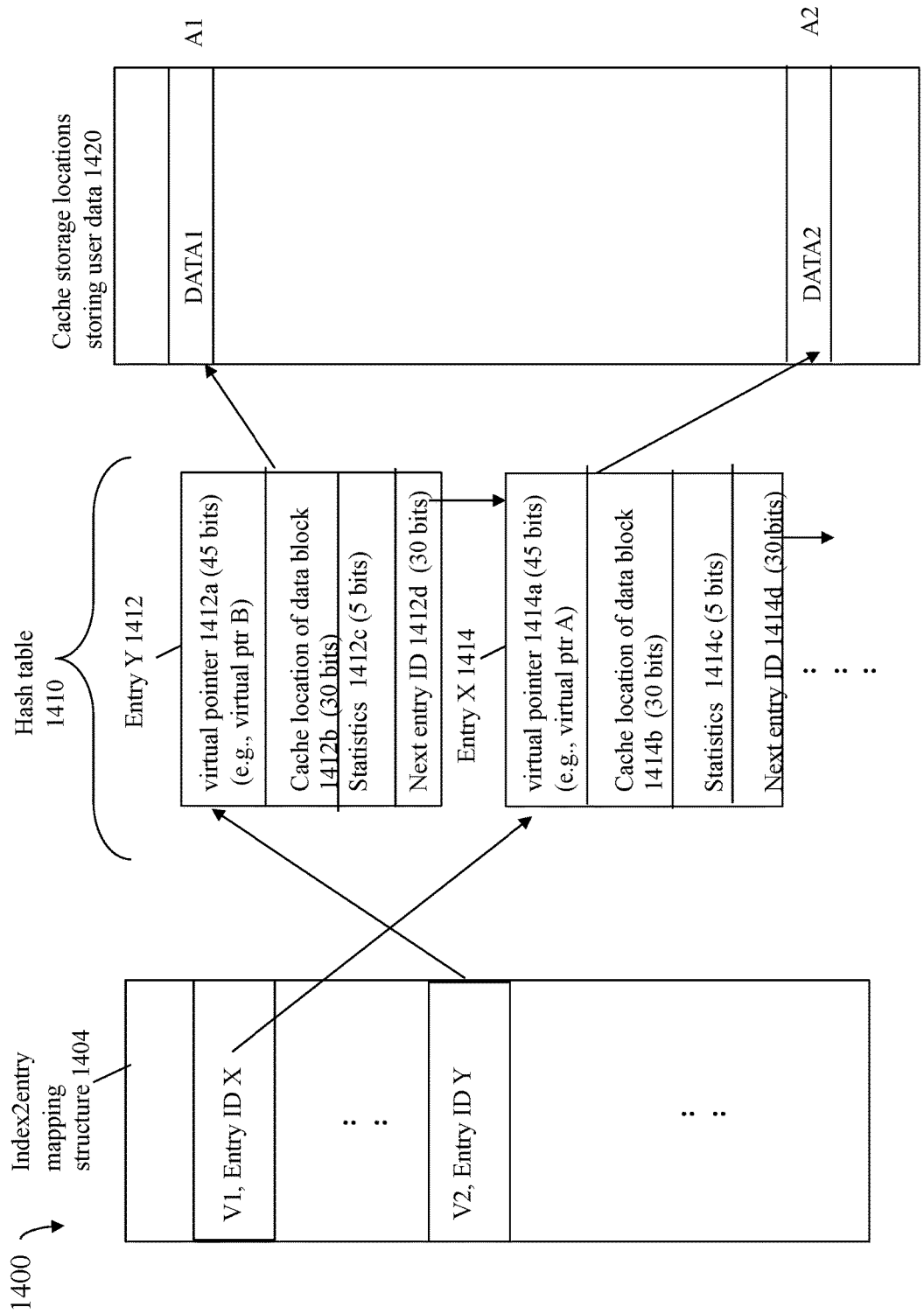
FIG. 8 is an example illustrating a cache that is not organized in accordance with the techniques herein.

Referring to FIG. 8, shown is an example illustrating use of a hash table and an index2entry mapping structure in connection with entries associated with cached user data. The example 1400 includes a hash table 1410, an index2entry mapping structure 1404, and cache storage locations 1420 storing cached user data.

The hash table 1410 includes entries that may be stored in a linked list data structure. The hash table 1410 may also be stored in the cache along with the cache storage locations 1420 including the cached user data. The hash table 1410 includes multiple entries including the MD used in connection with caching the user data stored in the cache storage locations 1420. The hash table 1410 includes multiple entries such as MAX entries where MAX is a non-zero integer. For example, in at least one embodiment, MAX may be $2^{30}$.

In this example, assume that a single linked list is used in connection with implementing the hash table 1410 where each entry other than the last entry points to the next entry in the list. The hash table 1410 includes a first entry 1412 and a second entry 1414.

When storing a user data block, such as data block 1362, in the cache, a key K1 for the data block 1362 may be hashed or mapped to an entry in the hash table 1410. A hash function H may be used which takes as an input the key K1 for the data block 1362 and outputs a hash or hash value HV1. The foregoing may be represented as H(K1)=HV1. HV1 may denote an entry in the hash table 1410 used for storing the MD used in connection with caching the data block 1362. Assume that the virtual pointer 358a denoted by virtual ptr B is used as the key K1. The index V2 may be determined for the data block 1362 based on HV1 generated by the hash function H based on the key K1 for the data block 1362. Assume in this example that V2 is HV1 using all bits of the generated hash value.

In a similar manner, when storing data block 1364, in the cache, a key K2 for the data block 1364 may be hashed or mapped to an entry in the hash table 1410. The hash function H may be used which takes as an input the key K2 for the data block 1364 and outputs a hash or hash value HV2. The foregoing may be represented as H(K2)=HV2. HV2 may denote an entry in the hash table 1410 used for storing the MD used in connection with caching the data block 1364. Assume that the virtual pointer 1360a denoted by virtual ptr A is used as the key K2. The index V1 may be determined for the data block 1364 based on HV2 generated by the hash function H based on the key K2 for the data block 1364. Assume in this example that V1 is HV2 using all bits of the generated hash value.

As noted above, the element 1420 may denote a portion or section of the cache used to store the cached user data. A1 is the cache address or location including the content DATA1 and A2 is the cache address or location including the content DATA 2. Assume that A1 denotes the cache memory location storing the content "DATA1" of data block 1362, and that A2 denotes the cache memory location storing the content "DATA2" of data block 1364.

The entries 1412 and 1414 illustrate MD fields that may be stored in each entry of the hash table 1410. For example, the entry 1412 includes the virtual pointer 412a that is 45 bits in size, the cache location of the data block 1412b that is 30 bits in size, the statistics 412c that is 5 bits in size, and the next entry ID 1412d that is 30 bits in size. Assume, for example, that HV1 for data block 1362 maps to the first entry 1412 of the hash table. Thus, entry 1412 includes MD used in connection with caching the data block 1362 at the cache location or address A1. The entry 1412 for the data block 1362 includes the virtual pointer 1358a (denoted by virtual ptr B) stored in the field 1412a; the entry ID or pointer 1412d to the next entry 1414; statistics 4112c such as a reference counter or other information that may be used in connection with cache management; and the field 1412b includes a pointer or address, such as address A1, to the cache location storing the content of the data block 362.

The entry 414 includes the virtual pointer 1414a that is 45 bits in size, the cache location of the data block 1414b that is 30 bits in size, the statistics 1414c that is 5 bits in size, and the next entry ID 1414d that is 30 bits in size. Assume, for example, that HV2 for data block 1364 maps to the second entry 1414 of the hash table. Thus, entry 1414 includes MD used in connection with caching the data block 1364 at the cache location or address A1. The entry 1414 for the data block 1364 includes the virtual pointer 1360a (denoted by virtual ptr A) stored in the field 1414a; the entry ID or pointer 1414d to the next entry (not illustrated); statistics 1414c such as a reference counter or other information that may be used in connection with cache management; and the field 1414b includes a pointer or address, such as address A2, to the cache location storing the content of the data block 1364.

The cache storage locations 1420 storing user data may denote a large number of cache storage locations. In the example illustrated, element 1420 may denote a section of the cache storing cached user data. The cache storage locations of 1420 may span a range of locations, offsets or addresses in cache forming a consecutive range from a starting location, offset or address S1 to an ending location, offset or address Sn. In this example, the total number of storage locations in 1420, such as denoted by Sn (assuming S1 is 1), may be a positive integer that requires 30 bits of storage. For example, Sn may be the integer value equal to $2^{30}$, or 1073741824, where 1420 includes $2^{30}$ storage locations having corresponding cache locations, offsets or addresses denoted by the range S1 . . . Sn.

As noted above in at least one embodiment, the number of entries MAX in the hash table 1410 may also be $2^{30}$. In the example 1400, each next entry ID field, such as 1412*d*, 1414*d* may identify a particular one of the $2^{30}$ entries next in the linked list of entries of the hash table 1400.

Once the entries 1412 and 1414 have been added to the hash table 1410, respectively, for data blocks 1362 and 1364, the index2entry mapping structure 1404 may be updated. The index2entry mapping structure 1404 may include entries mapping index values for different cached data blocks to corresponding hash table entries of the hash table 1410. Each of the index values for a data block may be determined using any suitable information or values associated with the data block. As noted above, the index for a data block may be determined as the full hash value generated using the hash function H for the particular key value associated with the data block.

The index2entry mapping structure 1404 may include an entry for each index value mapped to a corresponding hash table entry. For example, entry 1404*a* denotes the mapping from the index value V1 to the entry ID X 1414; and entry 1404*b* denotes the mapping from the key value V2 to the entry ID Y 1412.

In such a system implementing the structures of the example 1400 of FIG. 8, it is noted that the hash table 1410 includes entries organized on one linked list having $2^{30}$ entries. Thus each next entry ID field, such as 1412*d* and 1414*d* includes 30 bits to represent the maximum or largest possible value for an entry ID (denoting an entry of the hash table 1410). Additionally, the cache storage locations 1420 are logically viewed and used as a single set of locations or entries for storing user data. For example, there may be $2^{30}$ cache locations in 1420 for storing user data. Thus, the largest possible integer value denoting a cache address or location in 1402 may be represented using 30 bits. For this reason the cache location of the data block fields 1412*b* and 1414*b* each include 30 bits. In the particular example, each entry of the hash table 1410 is 110 bits or 4 bytes (assuming a byte is the smallest unit of storage granularity for each entry). Since the table 1410 includes $2^{30}$ entries, $14*2^{30}=14$ GB of the cache, such as RAM, may be used to store the MD for the cache entries. The structures 1410 and 1404 in the FIG. 8 may generally be used as described in connection with the structures 510 and 520 of the FIG. 7A.

In order to reduce the amount of memory used in the hash table 1410 for storing MD of cached user data, an embodiment in accordance with the techniques herein will now be described with reference to FIG. 9 that partitions the entries of the hash table 1410 into buckets of entries. Each bucket may include the same number of entries. Additionally, the cache storage 1420 used to store the user data may be partitioned into subsections. In at least one embodiment, the number of entries in each bucket is known and predetermined. In such an embodiment, a subsection or area of the cache 1420 may be allocated for exclusive use only by a single bucket. Thus, each bucket is associated with a corresponding subsection of the cache 1420 that is used to store only the user data blocks associated with entries of that particular bucket. In such an embodiment, the size of each entry of the hash table may be reduced. In particular, in at least one embodiment described below, the cache location of the data block fields 412*b*, 1414*b* and the next entry ID fields 1412*d*, 1414*d* may be reduced in size.

Figure 9:
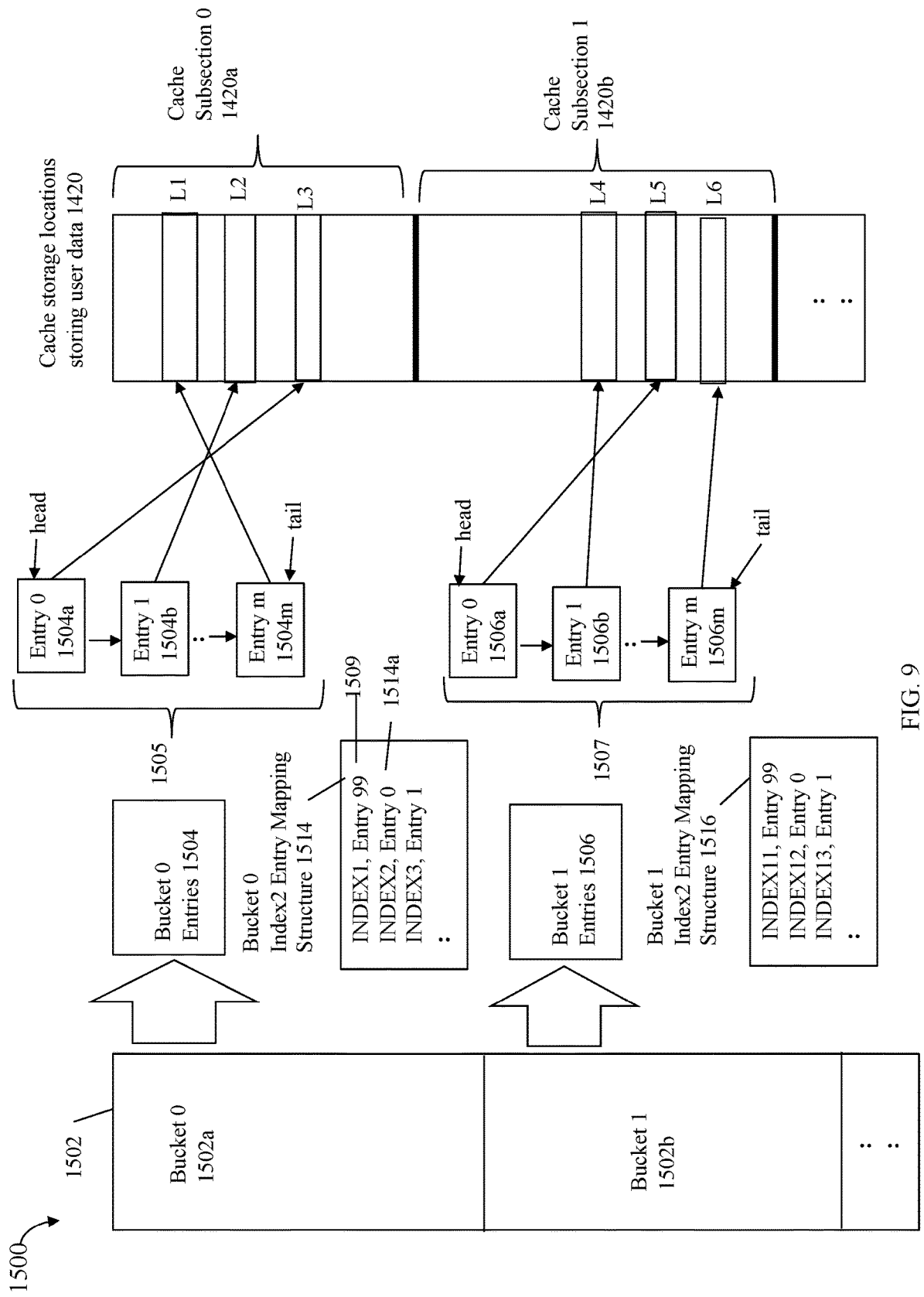
FIG. 9 is an example illustrating a cache and associated data structures in an embodiment in accordance with the techniques herein.

Referring to the FIG. 9, shown is an example 1500 illustrating use of the techniques herein. In the example 1500, all the entries of the hash table may be partitioned into buckets each including the same number of entries. Let MAX denote the number of entries in the hash table. Assuming that each bucket includes NUM1 entries, then there are MAX/NUM1 buckets.

The element 1502 may denote the MAX/NUM1 buckets. For example, the element 1502*a* denotes the bucket 0 having bucket entries 1504 and an associated index2entry mapping structure 1514. The element 1502*b* denotes the bucket 1 having bucket entries 1506 and an associated index2entry mapping structure 1516. In a similar manner, each of the MAX/NUM1 buckets may include a bucket of entries and an associated index2entry mapping structure.

In the embodiment illustrated in FIG. 9, each of the MAX/NUM1 buckets may implement and manage the entries of the bucket using a linked list of the entries and an index2entry mapping structure in a manner similar to that as described in connection with FIG. 8. One difference with the FIG. 9 embodiment as compared to the FIG. 8 implementation is that the entries of each linked list are managed per bucket independent of all other buckets.

For example, the element 1505 illustrates the bucket 0 entries 1504 in more detail. The element 1505 includes a linked list of the entries 1504*a-m* for bucket 0. Each of the entries 1504*a-m* may include fields of information similar to that as described in connection with FIG. 8 with the difference that each such entry is reduced in size as further described in more detail below. The element 1507 illustrates the bucket 1 entries 1506 in more detail. The element 1507 includes a linked list of the entries 1507*a-m* for bucket 0. Each of the entries 1504*a-m* may include fields of information similar to that as described in connection with FIG. 8 with the difference that each such entry is reduced in size as further described in more detail below.

In the example 1500, the cache storage locations storing user data 1420 is also partitioned into cache subsections. In particular, there may be MAX/NUM1 cache subsections where each cache subsection is associated with a different one of the buckets. The number of cache locations or addresses in each of the J subsections may be equal to the number of entries in each bucket. Generally, each cache subsection J is associated with a corresponding bucket J of entries whereby the cache subsection J is used only for caching data blocks having entries in the corresponding bucket J. For example, cache subsection 0 1420*a* may denote a portion of the cache storage locations 1420 associated with bucket 0 1502*a*. The cache subsection 0 1420*a* includes cache locations used to only store cached data blocks having entries in the bucket 0, such as in the linked list 1505 of entries of bucket 0. For example, entry 1504*a* includes MD used in connection with caching a data block stored at cache location L3; entry 1504*b* includes MD used in connection with caching a data block stored at cache location L2; and entry 1504*m* includes MD used in connection with caching a data block stored at cache location L1.

For example, cache subsection 1 1420*b* may denote a portion of the cache storage locations 1420 associated with bucket 1 1502*b*. The cache subsection 1 1420*b* includes cache locations used to only store cached data blocks having entries in the bucket 1, such as in the linked list 1507 of entries of bucket 1. For example, entry 1506*a* includes MD used in connection with caching a data block stored at cache location L5; entry 1506*b* includes MD used in connection with caching a data block stored at cache location L4; and entry 1506*m* includes MD used in connection with caching a data block stored at cache location L6.

In at least one embodiment, such as described in connection with FIGS. 9 and 10 herein, there may be 1024 hash table entries in each bucket. In such an embodiment, the largest or maximum value for an entry ID may be expressed using 10 bits. In such an embodiment, assume that the size of each cache subsection include a number of storage locations equal to the number of entries in each bucket. Thus, the largest or maximum value for a cache location or address in a single cache subsection may also be expressed using 10 bits.

In at least one embodiment in accordance with the techniques herein in which the virtual pointer (ptr) associated with the data block is used as the key, H(virtual ptr)=HV may be used to select one of the MAXNUM1 buckets. Once the bucket is selected for the data block, a hash table entry may be allocated for use with a new data block to be stored in the cache. For example, virtual ptr2 may denote the virtual pointer for a new data block. H(virtual ptr2)=HV2 may be generated using the hash function H. Depending on the embodiment, some or all the bits of the HV2 may be used in selecting a bucket and determining the bucket ID for the new data block. For example, assume there are $2^{20}$ buckets and that the hash function H generates hash values that are more than 20 bits. In this case, 20 bits of the hash value may be used to form the bucket ID of the particular bucket for the new data block having the virtual pointer=virtual ptr2. In this example, assume that the 20 bits of HV2 used have an integer value of 0 whereby the bucket ID=0 and the bucket 0 is selected. A hash entry for the new data block may be obtained from the list 1505, such as by evicting the cache entry associated with the least recently data block at the tail of the list. The hash table entry selected is then updated or overwritten to include the MD for the new data block and the new data block may be stored in the cache location L3 Once the entry has been updated it may be moved to the head of the linked list 1505. Element 1505 illustrates the state of the entries after the entry 0 1504*a* is moved to the head of the list 1505. Thus, prior to the move, the entry 0 1504*a* may have been located at the tail of the list.

Additionally, an index may be determined for the newly added or updated entry 1504*m* containing the MD for the new data block added to the cache. The index for the data block may be based on a number of bits from the hash value HV2 determined for the data block, where H(virtual ptr2) =HV2. For example, assume that HV2 is an integer value based on 64 bits (e.g., the hash function H generates 64 bit hashes). The index INDEX1 for the data block may be an integer value based on the bit values stored in a specified number of bit positions of the generated hash value HV2. The number of bit positions may be sufficient to represent the number of entries in each bucket. For example, if there are 1024 entries in each bucket, 10 bits of HV2 may be used as INDEX1.

As denoted by the entry 1514*a*, the bucket 0 index2entry mapping structure 1514 is also updated to indicate the mapping from INDEX1 to entry 0 1504*a*.

The bucket 0 index2entry mapping structure 1514 may be subsequently used to determine whether the hash table contains an entry corresponding to a particular index of a data block. For example, consider the entry 1514*a* indicating that INDEX1 is mapped to entry 0 1504*a* for a data block stored at cache location L3. At a later point in time, processing may be performed to obtain the data block from the cache. In connection with such processing, the mapping information of entry 1514*a* may be used to directly access the entry 1504*a*. As described elsewhere herein, the entry 1504*a* may include the cache location or address L3 of where the data block is stored. In this manner, the cache location of the entry 1504*a* may be used to obtain the cached data block stored at the cache location L3, such as for servicing a read I/O operation.

Figure 10:
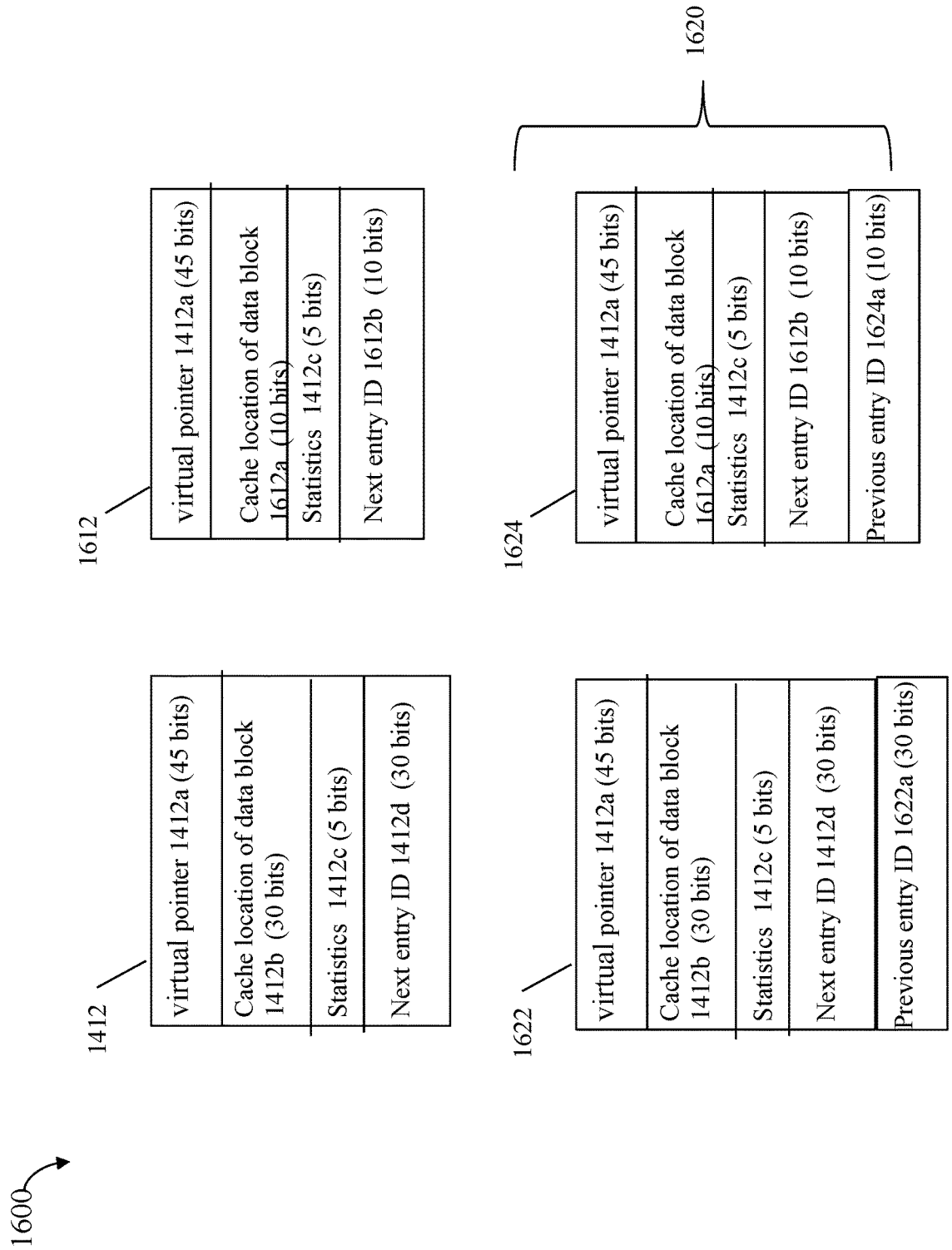
FIG. 10 is an example illustrating information that may be included each entry of a hash table in an embodiment in accordance with the techniques herein.

Referring to FIG. 10, shown is an example illustrating in more detail the fields of a hash table entry in at least one embodiment in accordance with the techniques herein. The example 1600 includes the element 1412 denoting the fields and associated sizes included in each hash table entry in a system not in accordance with the techniques herein such as described with respect to the FIG. 8 above. The element 1412 in the FIG. 10 is as illustrated in the FIG. 8 and has been reproduced in the FIG. 10 for simplification in comparison purposes to the sizes of the respective fields of the reduced size of the hash entry 1612. The hash entry 1612 illustrates the fields and respective sizes of each hash table entry in the embodiment described in connection with the FIG. 9 in accordance with the techniques herein. Thus, the entry 1612 denotes the fields and associated field sizes of hash entries, for example, in the bucket lists of entries denoted, for example, by elements 1504, 1505, 1506 and 1507 of the FIG. 9. The entry 1612 may denote the fields and associated sizes of hash entries in at least one embodiment where there are 1024 entries in each bucket and accordingly 1024 cache locations in each cache subsection J of 1420 of FIG. 9.

The cache location of a data block field 1612*a* has a size of 10 bits in the entry 1612 in comparison to the corresponding cache location of a data block field 1412*b* of the entry 1412 which has a size of 30 bits. Thus, the field 1612*a* indicates a reduction of 10 bits per entry in the embodiment described in connection with FIG. 9. Additionally, the next entry ID field 1612*b* has a size of 20 bits in the entry 1612 in comparison to the corresponding next entry ID field 1412*d* of the entry 1412 which has a size of 30 bits. Thus, the field 1612*b* indicates a reduction of 20 bits per entry in the embodiment described in connection with FIG. 9. In total, each entry of the hash table in the embodiment of FIG. 9 is 70 bits (e.g., reduced by 40 bits in comparison to the embodiment of FIG. 8) which, rounded up to the nearest byte size, is a cache space savings of 9 bytes per entry.

Elements 1412 and 1612 correspond to hash table entries that may be used in connection with singly linked list implementation. To further illustrate the reduction in size of hash table entries in an embodiment in accordance with the techniques herein, for completeness element 1620 further includes hash table entries that may be used in connection with a doubly linked list rather than a singly linked list.

Element 1622 represents a hash table entry denoting the fields and associated sizes included in each hash table entry in a system not in accordance with the techniques herein such as described with respect to the FIG. 8 above. The entry denoted by 1622 includes the same fields as the entry 1412 with the additional filed 1622*a* denoting the previous entry ID or back pointer to the previous entry in the doubly linked list implementation.

Element 1624 represents a hash table entry denoting the fields and associated sizes included in each hash table entry in a system in accordance with the techniques herein such as described in connection with the FIG. 9 with the difference that the hash table may be implemented using a doubly linked list implementation. The entry denoted by 1624 includes the same fields as the entry 1612 with the additional filed 1624*a* denoting the previous entry ID or back pointer to the previous entry in the doubly linked list implementation.

In connection with the entries 1622 and 1624 for a doubly linked list, use of the techniques herein further saves an additional 20 bits per entry as illustrated by the 20 bit savings when using the field 1624*a* is rather than the field 1622*a*.

In the embodiment described above in connection with the FIGS. 9 and 10, all the bits of the bucket ID may be extracted from, or based on, the hash value HV generated by the hash function H based on a particular key K (e.g., virtual or indirect pointer) for a data block stored in the cache. As a variation, in at least one embodiment, the bits used in forming the bucket ID may be based on, or extracted from, multiple sources. In at least one embodiment, the bits used in forming the bucket ID may be based on the HV and also based on the particular key K of the data block as described below in connection with the FIG. 11. Thus, in such an embodiment as described below in connection with the FIG. 11, one or more bits of the particular key K may be encoded in the bucket ID and may result in yet a further reduction in the size of each entry.

Figure 11:
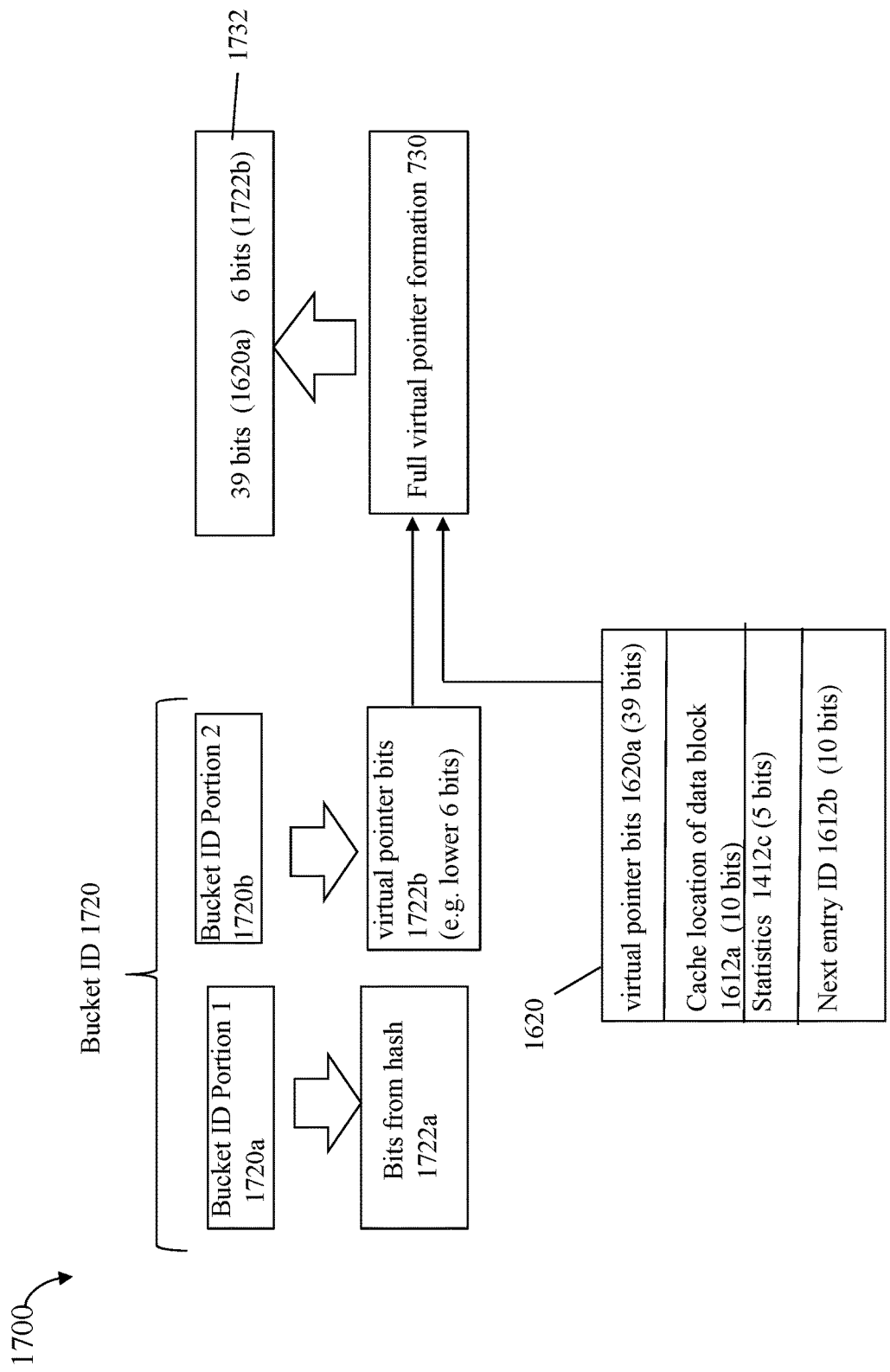
FIG. 11 is an example illustrating formation of a bucket identifier and a pointer used as a key value in an embodiment in accordance with the techniques herein.

Referring to FIG. 11, shown is an example 1700 illustrating a technique that may be used in an embodiment to form the bucket ID denoting the bucket selected for a particular data block being stored in the cache. The example 1700 illustrates the bucket ID 1720 including bucket ID portion1 1720*a* and bucket ID portion 2 1720*b*. Elements 1720*a* and 1720*b* may each denote some number of bits of the bucket ID 1720 extracted from different sources. For example, element 1722*a* indicates that the bucket ID portion 1 1720*a* may denote a first number of bits extracted from the hash value HV=H(K) of the data block, where the key K may be the virtual pointer for the data block. Elements 1722*b* indicates that the bucket ID portion 2 1720*b* may denote a second number of bits extracted from the key K for the data block, where K is the virtual pointer for the data block. For example, the bottom or lower 6 bits of the virtual pointer may be used in forming the bucket ID 1720 with the remaining upper bits of the bucket ID 1720 extracted from the hash HV. For example, if the bucket ID 1720 is 20 bits, the lower 6 bits of the virtual pointer may be used as 1720*b* and the remaining upper 14 bits may be extracted from the hash HV.

In connection with such an embodiment as denoted in connection with the FIG. 11 for forming the bucket ID 1720, the number of bits of the virtual pointer field in each entry may be further reduced to 39 bits since the remaining 6 bits are encoded and implied by the bucket ID of the bucket into which the entry for the data block is located. When forming the full 45 bit VLB pointer such as denoted by the full virtual pointer formation 730, processing may be performed to concatenate or combine the 39 bits from the virtual pointer field 1620*a* of the entry with the 6 bits of the virtual pointer 1722*b* as encoded in the bucket ID 1720. The result of the foregoing combining or concatenation of the bits 1722*b* and 1620*a* is the full 45 bit virtual pointer 1732.

Element 1620 illustrates the fields and field sizes of each entry in such an embodiment in which 6 bits of the virtual pointer are encoded in the bucket ID 1720. Each entry 1620 may include a virtual pointer field 1620*a* denoting a partial virtual pointer value having a size of 39 bits; a cache location of the data block field 1622*a* having a size of 10 bits; a statistics field 1412*c* having a size of 5 bits; and a next entry ID field 1612*b* having a size of 10 bits. Thus, each entry 1620 may be further reduced to a size of 64 bits.

It should be noted that the particular number of bits and fields or data values used in forming the bucket ID 1720 may vary from the particular sizes, fields and data values described herein. More generally, the bucket ID 1720 may be based on any suitable number of data values or items, and also based on any suitable number of bits from each such data value or item.

In the embodiments described herein, the virtual pointer for a data block used as the key value for the data block is also stored in the data block's hash table entry since the virtual pointer may be used in connection with other processing. Consistent with other discussion herein, in at least one embodiment, the virtual pointer may be an address of an entry in a VLB block or structure. The entry of the VLB may further include a pointer to the user data block as stored on non-volatile backend physical storage of a PD 16*a-n*. In at least one embodiment, the virtual or indirect pointer may be used in connection with verifying that a particular hash table entry corresponds to an expected data block and may be used in connection with detecting a hash collision. As part of verifying that a particular hash entry corresponds to an expected data block, the full key, such as the full virtual pointer may be used, for example, when determining whether a particular data block is stored in the cache. For example, with reference back to FIG. 9, assume that processing is performed to determine whether a candidate data block having the virtual pointer "virtual ptr1" is stored in the cache. In this case, processing may be performed as described in connection with FIG. 9 to determine that hash value HV1=H(virtual ptr1) and use a number of bits from HV1 to form the bucket ID and select a bucket. Assume that the bucket ID=0 so that bucket 0 1502*a* is selected. The bucket0 index2entry mapping structure 1514 may be queried to determine whether the candidate data block is already stored in the cache. An index value for the candidate data block is determined, such as based on a number of bits in HV1. In this example, assume that the candidate block's index is INDEX2. In this case, the entry 1509 may be located indicating that entry 99 of the linked list 1505 includes MD used in connection with caching a particular data block having the INDEX2. The entry 99 of the list 1505 is located and the 45 bit virtual pointer field 1412*a* of the entry may be compared to the virtual pointer of the candidate data block. If the stored virtual pointer 1412*a* of the entry 99 matches the virtual pointer of the candidate data block, then the candidate data block matches the cached data block described by the entry 99 and the candidate data block is already stored in the cache.

If the stored virtual pointer 1412*a* of the entry 99 does not match the virtual pointer of the candidate data block, then the candidate data block does not match the cached data block described by the entry 99. In the latter case where the virtual pointers do not match, a hash collision is determined. Depending on the particular techniques used in an embodiment to handle hash collisions, one or more other entries may also be similarly processed to determine whether any other entry describes a cached data block matching the candidate data block. If no entry is located having a virtual pointer matching the virtual pointer of the candidate data block, then processing may determine that the desired candidate data block is not stored in the cache. For example, if such processing is performed to obtain the data block to service a read operation, a cache miss results and the candidate data block from the backend non-volatile physical storage on a PD.

Additionally and more generally, an embodiment may use the full key value such as the virtual pointer stored each entry of the hash table, in connection with detecting hash collisions. As known in the art, a hash function may be used that generates hash values approximating a uniform or even distribution with respect to all possible hash values that can be generated by the function. Thus, it is possible that the hash function may generate the same hash value for 2 different inputs resulting in a hash collision. In this case, 2 different keys, K1 and K2, generate the same hash values where H(K1)=H (K2) and thus the data blocks may be mapped to the same hash entry. Any suitable technique known in the art may be used to handle hash collisions.

Figure 12:
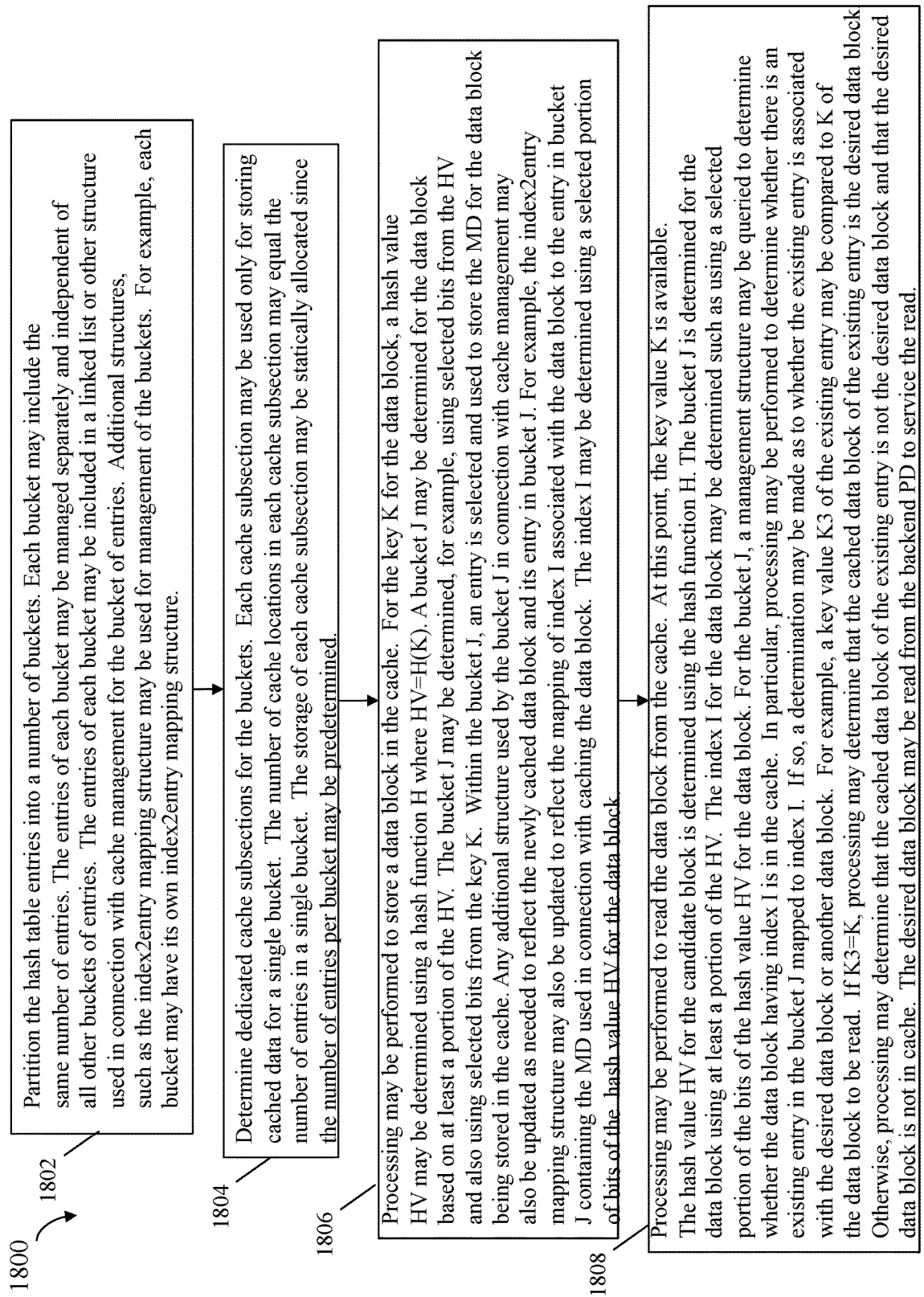
FIG. 12 is a flowchart of processing steps that may be performed in an embodiment in accordance with the techniques herein.

Referring to FIG. 12, shown is a flowchart of processing steps that may be performed in an embodiment in accordance with the techniques herein. The flowchart 1800 summarizes processing described above.

At the step 1802, hash table entries may be partitioned into a number of buckets. Each bucket may include the same number of entries. The entries of each bucket may be managed separately and independently of all other buckets of entries. The entries of each bucket may be included in a linked list or other structure used in connection with cache management for the bucket of entries. Additional structures, such as the index2entry mapping structure, may be used for management of the buckets. For example, each bucket may have its own index2entry mapping structure. In at least one embodiment using a linked list to implement the list of entries of a single bucket, each entry may also at least one field that is a pointer to, or an entry ID of, another entry in the list. The size of the field referencing another entry in the list may be determined in accordance with the number of entries in the list. For example, if there are 1024 entries per bucket, the size of the field may be $2^{10}$ to accommodate the largest possible entry ID. From the step 1802, control proceeds to the step 1804.

At the step 1804, processing may be performed to determine dedicated cache subsections for the buckets. Each cache subsection may be used only for storing cached data for a single bucket. The number of cache locations in each cache subsection may equal the number of entries in a single bucket. The storage of each cache subsection may be statically allocated since the number of entries per bucket may be predetermined. Each entry may also include a field that is a pointer to a cache location. The size of the field may be determined in accordance with the number of cache locations in a single cache subsection, which may equal the number of entries per bucket. If there are 1024 entries per bucket, the size of the field may be $2^{10}$ to accommodate the largest possible cache address in a cache subsection. From the step 1804, control proceeds to the step 1806.

At the step 1806, processing may be performed to store a data block in the cache. For the key K for the data block, a hash value HV may be determined using a hash function H where HV=H(K). A bucket J may be determined for the data block based on at least a portion of the HV. The bucket J may be determined, for example, using selected bits from the HV and also using selected bits from the key K. Within the bucket J, an entry is selected and used to store the MD for the data block being stored in the cache. Any additional structure used by the bucket J in connection with cache management may also be updated as needed to reflect the newly cached data block and its entry in bucket J. For example, the index2entry mapping structure may also be updated to reflect the mapping of index I associated with the data block to the entry in bucket J containing the MD used in connection with caching the data block. The index I may be determined using a selected portion of bits of the hash value HV for the data block. From the step 1806, control proceeds to the step 1808.

At the step 1808, processing may be performed to read the data block from the cache. At this point, the key value K is available. The hash value HV for the candidate block is determined using the hash function H. The bucket J is determined for the data block using at least a portion of the HV. The index I for the data block may be determined such as using a selected portion of the bits of the hash value HV for the data block. For the bucket J, a management structure may be queried to determine whether the data block having index I is in the cache. In particular, processing may be performed to determine whether there is an existing entry in the bucket J mapped to index I. Such processing may use, for example, the index2entry mapping structure. If so, a determination may be made as to whether the existing entry is associated with the desired data block or another data block. For example, a key value K3 of the existing entry may be compared to K of the data block to be read. If K3=K, processing may determine that the cached data block of the existing entry is the desired data block. Otherwise, processing may determine that the cached data block of the existing entry is not the desired data block and that the desired data block is not in cache. The desired data block may be read from the backend PD to service the read.

It should be noted that the steps 1806 and 1808 are examples of uses of the cache and associated techniques as described herein. More generally, the cache organized in an embodiment in accordance with the techniques herein may be used in any suitable manner.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing cache management comprising:

partitioning a plurality of entries of a hash table into a plurality of buckets, wherein each of the plurality of buckets includes a portion of the plurality of entries of the hash table;

configuring a cache, wherein said configuring includes, for each bucket of the plurality of buckets, allocating a section of the cache for exclusive use by said each bucket; and performing first processing that stores a data block in the cache, wherein the first processing includes:
determining a hash value for a data block;

selecting, in accordance with the hash value, a first bucket of the plurality of buckets, wherein a first section of the cache is used exclusively for storing cached data blocks of the first bucket;

storing metadata used in connection with caching the data block in a first entry of the first bucket; and storing the data block in a first cache location of the first section of the cache.

2. The method of claim 1, wherein each bucket of the plurality of buckets includes a same number of the plurality of entries of the hash table.

3. The method of claim 1, wherein the first section of the cache includes a number of cache locations equal to a number of entries in the first bucket.

4. The method of claim 1, wherein said configuring allocates a plurality of sections of the cache, wherein a different one of the plurality of sections is allocated for exclusive use by a different corresponding one of the plurality of bucket, and wherein each of the plurality of sections of the cache includes a same number of cache locations.

5. The method of claim 4, wherein each entry of the plurality of entries includes a first field identifying a cache location of the cache, and wherein the first field has a size determined in accordance with the same number of cache locations of the cache allocated for exclusive use by one of the plurality of buckets.

6. The method of claim 5, wherein the first field of the first entry references the first cache location.

7. The method of claim 1, wherein the first bucket has a first bucket identifier determined using at least some bits of the hash value determined for the data block.

8. The method of claim 1, wherein the first entry is associated with an index determined using at least some bits of the hash value determined for the data block.

9. The method of claim 1, wherein the hash value is generated using a hash function and a key that is provided as an input to the hash function, wherein the key is associated with the data block.

10. The method of claim 9, wherein the key has an associated size of N bits and wherein the first bucket has a first bucket identifier determined using M of the N bits of the key associated with the data block.

11. The method of claim 10, wherein M<N and the M bits of the key are encoded in the first bucket identifier.

12. The method of claim 11, wherein the first entry includes a field having a size that is N-M bits and includes bit values of the N-M bits of the key that are not encoded in the first bucket identifier.

13. The method of claim 1, further comprising performing second processing to read a first data block from the cache, the second processing including:
determining a first hash value for the first data block using a first key associated with the first data block;
selecting one bucket of the plurality of buckets using at least some bits of the first hash value, wherein a specified section of the cache is used exclusively for storing cached data blocks of said one bucket;
determining a first index for the first data block using at least some bits of the first hash value;
using first mapping information for said one bucket to identify a particular entry of said one bucket that is associated with said first index, wherein said first mapping information maps indices of data blocks cached in said specified section of the cache to corresponding entries in said one bucket;
determining whether said first key matches an existing key of the particular entry; and
responsive to determining the first key matches the existing key of the particular entry, determining that the particular entry is associated with the first data block that is stored in the cache.

14. The method of claim 13, wherein the particular entry includes a field identifying the cache location of the specified section of cache where the first data block is cached.

15. A system comprising:
at least one processor; and
at least one memory comprising code stored thereon that, when executed, performs a method of performing cache management comprising:
partitioning a plurality of entries of a hash table into a plurality of buckets, wherein each of the plurality of buckets includes a portion of the plurality of entries of the hash table;
configuring a cache, wherein said configuring includes, for each bucket of the plurality of buckets, allocating a section of the cache for exclusive use by said each bucket; and
performing first processing that stores a data block in the cache, wherein the first processing includes:
determining a hash value for a data block;
selecting, in accordance with the hash value, a first bucket of the plurality of buckets, wherein a first section of the cache is used exclusively for storing cached data blocks of the first bucket;
storing metadata used in connection with caching the data block in a first entry of the first bucket; and
storing the data block in a first cache location of the first section of the cache.

16. A computer readable medium comprising code stored thereon that, when executed, performs a method of performing cache management comprising:
partitioning a plurality of entries of a hash table into a plurality of buckets, wherein each of the plurality of buckets includes a portion of the plurality of entries of the hash table;
configuring a cache, wherein said configuring includes, for each bucket of the plurality of buckets, allocating a section of the cache for exclusive use by said each bucket; and
performing first processing that stores a data block in the cache, wherein the first processing includes:
determining a hash value for a data block;
selecting, in accordance with the hash value, a first bucket of the plurality of buckets, wherein a first section of the cache is used exclusively for storing cached data blocks of the first bucket;
storing metadata used in connection with caching the data block in a first entry of the first bucket; and
storing the data block in a first cache location of the first section of the cache.

17. The computer readable medium of claim 16, wherein each bucket of the plurality of buckets includes a same number of the plurality of entries of the hash table.

18. The computer readable medium of claim 16, wherein the first section of the cache includes a number of cache locations equal to a number of entries in the first bucket.

19. The computer readable medium of claim 16, wherein said configuring allocates a plurality of sections of the cache, wherein a different one of the plurality of sections is allocated for exclusive use by a different corresponding one of the plurality of bucket, and wherein each of the plurality of sections of the cache includes a same number of cache locations.

20. The computer readable medium of claim 19, wherein each entry of the plurality of entries includes a first field identifying a cache location of the cache, and wherein the first field has a size determined in accordance with the same number of cache locations of the cache allocated for exclusive use by one of the plurality of buckets.

\* \* \* \* \*